(12) United States Patent
Merrill et al.

(10) Patent No.: US 9,923,306 B2
(45) Date of Patent: Mar. 20, 2018

(54) INTERCONNECTABLE SENSOR SYSTEM

(71) Applicant: Adalet/Scott Fetzer Company, Cleveland, OH (US)

(72) Inventors: John W. Merrill, North Ridgeville, OH (US); Julie A. Stalder, Strongsville, OH (US); Robert S. Kress, North Royalton, OH (US)

(73) Assignee: Adalet/Scott Fetzer Company, Cleveland, OH (US)

( * ) Notice: Subject to any disclaimer, the term of this patent is extended or adjusted under 35 U.S.C. 154(b) by 0 days.

(21) Appl. No.: 15/463,973

(22) Filed: Mar. 20, 2017

(65) Prior Publication Data

US 2017/0194742 A1 Jul. 6, 2017

Related U.S. Application Data

(63) Continuation-in-part of application No. 14/658,889, filed on Mar. 16, 2015, now Pat. No. 9,612,980.

(60) Provisional application No. 62/432,952, filed on Dec. 12, 2016, provisional application No. 62/452,632, filed on Jan. 31, 2017.

(51) Int. Cl.
| | |
|---|---|
| *H01R 13/631* | (2006.01) |
| *H01R 13/15* | (2006.01) |
| *H01R 13/641* | (2006.01) |
| *G06F 13/40* | (2006.01) |
| *G01C 17/38* | (2006.01) |

(52) U.S. Cl.
CPC .......... *H01R 13/631* (2013.01); *H01R 13/15* (2013.01); *H01R 13/641* (2013.01); *G01C 17/38* (2013.01); *G06F 13/4068* (2013.01); *H01R 2201/20* (2013.01)

(58) Field of Classification Search
CPC .. H01R 13/631; H01R 13/15; H01R 2201/20; G01C 17/38; G06F 13/4068
See application file for complete search history.

(56) References Cited

U.S. PATENT DOCUMENTS

| | | |
|---|---|---|
| 9,612,980 B2 | 4/2017 | Davis et al. |
| 2005/0010206 A1 | 1/2005 | Nasab et al. |
| 2011/0022700 A1 | 1/2011 | Ramanath et al. |
| 2015/0077927 A1* | 3/2015 | Barnett ................. G06F 1/1626 361/679.43 |
| 2015/0272575 A1* | 10/2015 | Leimbach ............ A61B 17/072 227/175.3 |

* cited by examiner

*Primary Examiner* — Ernest Unelus
(74) *Attorney, Agent, or Firm* — Tarolli, Sundheim, Covell & Tummino LLP; John A. Yirga, Esq.

(57) ABSTRACT

A sensor interconnect system is disclosed. The sensor interconnect system comprises a first connection component comprising a locking pin, a locating pin and a spring loaded electrical contact comprising at least one contact pin and a second connection component comprising an alignment feature, a locking feature, and a second electrical contact. The second connection component is coupled to a sensor located in a contained fluid sensing area. The locking pin interacts with the locking feature to maintain a lateral position of the first connection component relative to the second connection component and the locating pin interacts with the alignment feature to maintain a rotational position of the first connection component relative to the second connection component. The at least one contact pin of the spring loaded electrical contact is in electrical communication with the second electrical contact, when the system is assembled.

20 Claims, 22 Drawing Sheets

INTERCONNECTABLE SENSOR SYSTEM

CROSS-REFERENCE TO RELATED APPLICATIONS

The present application is a continuation-in-part application filed under 35 U.S.C. § 120 of co-pending U.S. patent application Ser. No. 14/658,889 filed Mar. 16, 2015, published under U.S. Publication No. US 2015/0269095 published on Sep. 24, 2015, entitled FIELD CALIBRATION SYSTEM AND METHOD. The present application claims priority under 35 U.S.C. § 119(e) to U.S. Provisional Patent Application Ser. No. 62/432,952 filed Dec. 12, 2016 entitled INTERCONNECTABLE SENSOR SYSTEM and to U.S. Provisional Patent Application Ser. No. 62/452,632 filed Jan. 31, 2017 entitled TRACEABLE MEASUREMENTS ASSEMBLY AND CALIBRATION SCRIPT. The entire contents of the above-identified applications from which priority is claimed are incorporated herein by reference in their entireties for all purposes.

FIELD OF THIS DISCLOSURE

The present disclosure relates to an interconnectable sensor system. More specifically, the present disclosure relates to a two-part interconnectable sensor system having a quick change connection and disconnection system.

BACKGROUND

The use of sensors to monitor fluid flow speed, temperature pressure, etc., in a fluid container and/or fluid transport component is known. However, conventional sensors require a breach in the fluid container to insert or install the sensor. Typically, in a fluid container where fluid or gas is flowing, the flow of fluid is shut down, so that the fluid container can be breached for insertion and/or removal of a sensor. The flow shut down reduces efficiency of the fluid container, as less fluid is transported due to shut downs. Further, breaching the fluid container can lead to the addition of contaminates into the fluid.

SUMMARY

One aspect of the present disclosure includes a sensor interconnect system comprising a first connection component and a second connection component. The first connection component comprises a locking pin, a locating pin, and a spring loaded electrical contact comprising at least one contact pin. The second connection component comprises an alignment feature, a locking feature, and a second electrical contact. The second connection component is coupled to a sensor located in a contained fluid sensing area. Wherein, when assembled the locking pin interacts with the locking feature to maintain a lateral position of the first connection component relative to the second connection component and the locating pin interacts with the alignment feature to maintain a rotational position of the first connection component relative to the second connection component. Further, when assembled the at least one contact pin of the spring loaded electrical contact is in electrical communication with the second electrical contact.

Another aspect of the present disclosure includes a method of assembly of a sensor interconnect system kit comprising providing a first connection component comprising a locking pin, a locating pin, and a spring loaded electrical contact comprising at least one contact pin. The method further comprises providing a second connection component for insertion into the first connection component. The second connection component comprises an alignment feature, a locking feature, and a second electrical contact. The second connection component is coupled to a sensor located in a contained fluid sensing area. Inserting the second connection component into the first connection component comprises aligning the alignment feature with the locking member wherein, the locking member, in conjunction with the alignment feature, maintains a lateral trajectory of the first connection component relative to the second connection component during insertion. The second connection component is inserted into the first connection component until the locking pin interacts with the locking feature to maintain a lateral position of the first connection component relative to the second connection component, and until the locating pin interacts with the alignment feature to maintain a rotational position of the first connection component relative to the second connection component. The at least one contact pin of the spring loaded electrical contact is in electrical communication with the second electrical contact when the locking pin interacts with the locking feature but are not in contact when the locking pin is not interacting with the locking feature.

While yet another aspect of the present disclosure includes a sensor interconnect system comprising a first connection component comprising a locking pin, a locating pin, and a spring loaded electrical contact comprising at least one contact pin; and a second connection component comprising an alignment feature, a locking feature, and a second electrical contact. The second connection component is coupled to a sensor located in a contained fluid sensing area. Wherein the first connection component comprises a display that displays a metric corresponding to a condition that the sensor senses in the contained fluid sensing area, wherein, when assembled, the locking pin interacts with the locking feature to maintain a lateral position of the first connection component relative to the second connection component, wherein, the alignment feature comprises an alignment ramp, first and second pin ledges, and first and second alignment sidewalls that are separated an alignment distance from each other. The alignment distance is greater than or equal to a locking width of the locking pin. The alignment ramp is located between the first pin ledge and the second pin ledge. The locating pin interacts with the alignment ramp to maintain a rotational position of the first connection component relative to the second connection component. The at least one contact pin of the spring loaded electrical contact is in electrical communication with the second electrical contact to provide power to the sensor and to transmit the metric corresponding to the condition in the contained fluid sensing area to the display.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

Figure 1:
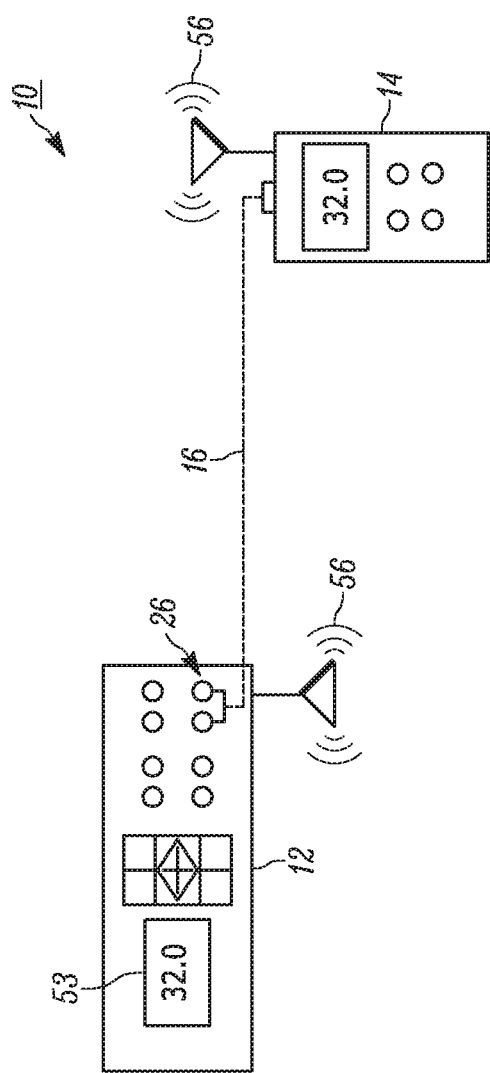
FIG. 1 is a schematic of a calibration system constructed in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to an interconnectable sensor system. More specifically, the present disclosure relates to a two-part interconnectable sensor system having a quick change connection and disconnection system.

Illustrated in FIG. 1 is a field calibration system 10 constructed in accordance with one example embodiment of the present disclosure. In the illustrated example embodiment, the field calibration system 10 comprises a calibration apparatus 12 and a remote transceiver 14 apparatus. The calibration apparatus 12 can be portable/moveable. The calibration apparatus 12 communicates with the remote transceiver 14 apparatus via communication link 16. The communication link 16 provides communication between the remote transceiver 14 apparatus and calibration apparatus 12 in a digital, analog, or combination of both over either a hard wired or wireless protocol. In the illustrated example embodiment, the remote transceiver 14 apparatus is a parameter instrument that reads parameters relating to fluid flow, transmission, temperature, pressure, viscosity, any combination thereof, and the like. The calibration apparatus 12, in addition to reading parameters from the remote transceiver 14 apparatus, audits and adjust the measuring elements and diagnostics located therein.

Figure 2:
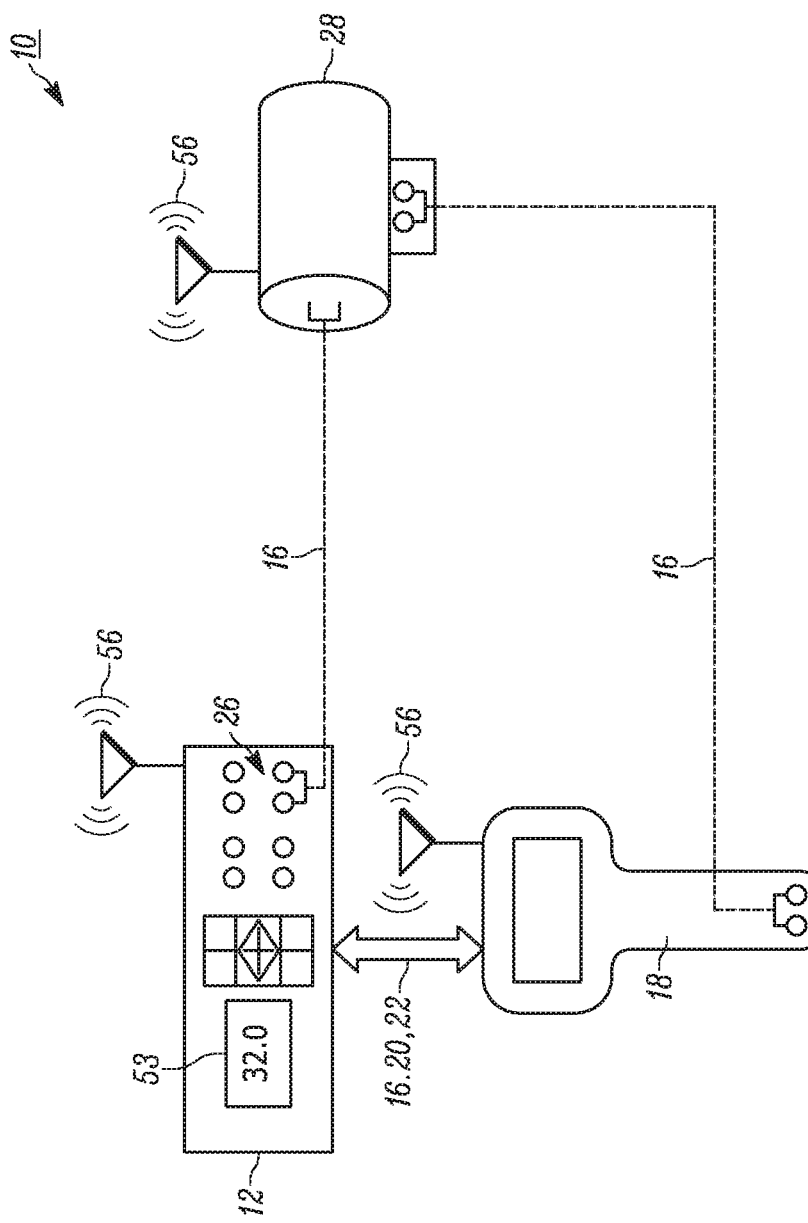
FIG. 2 is a schematic of a calibration system constructed in accordance with another example embodiment of the present disclosure.
Figure 3:
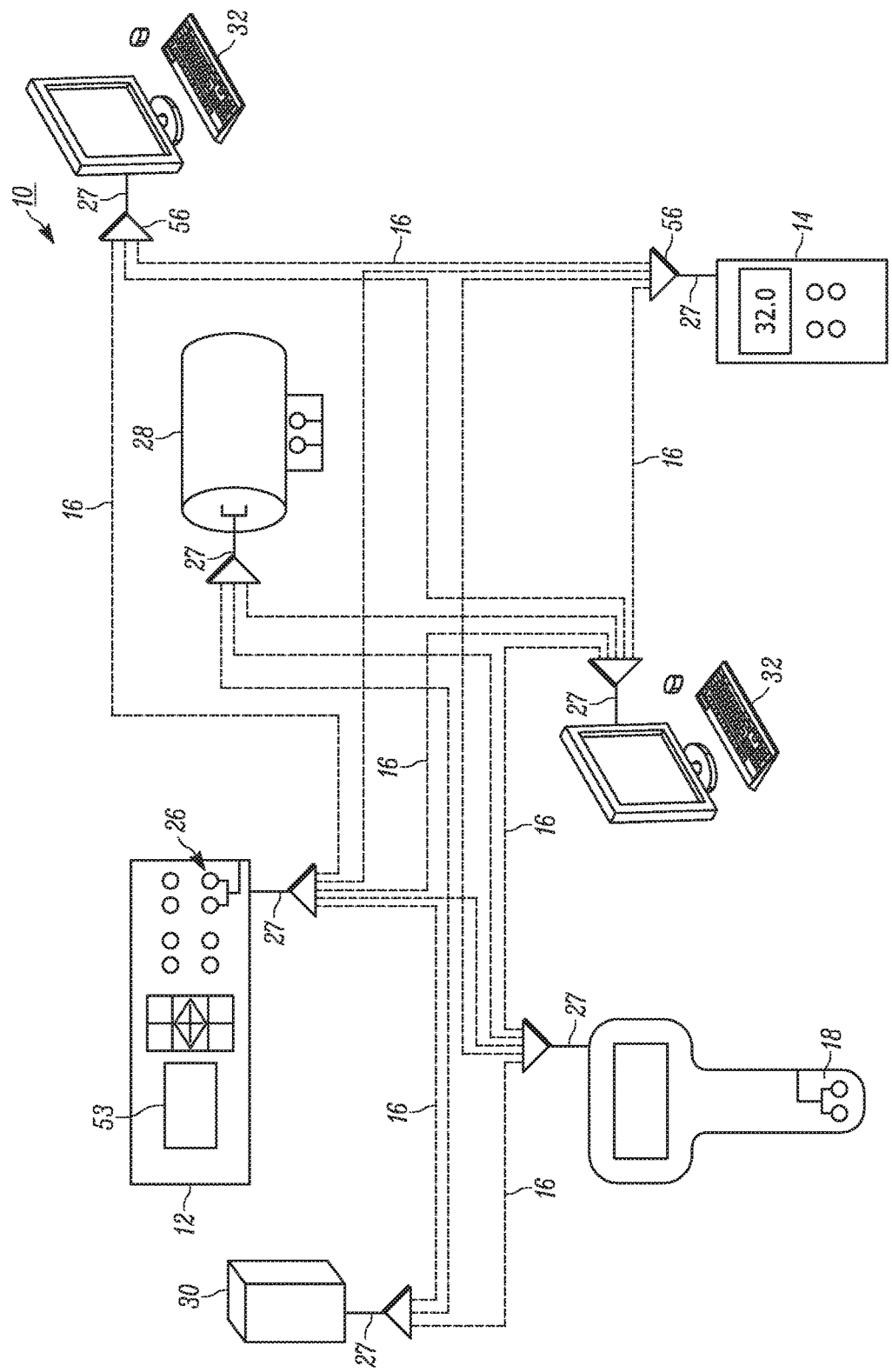
FIG. 3 is a schematic of a calibration system constructed in accordance with yet another example embodiment of the present disclosure.
Figure 4:
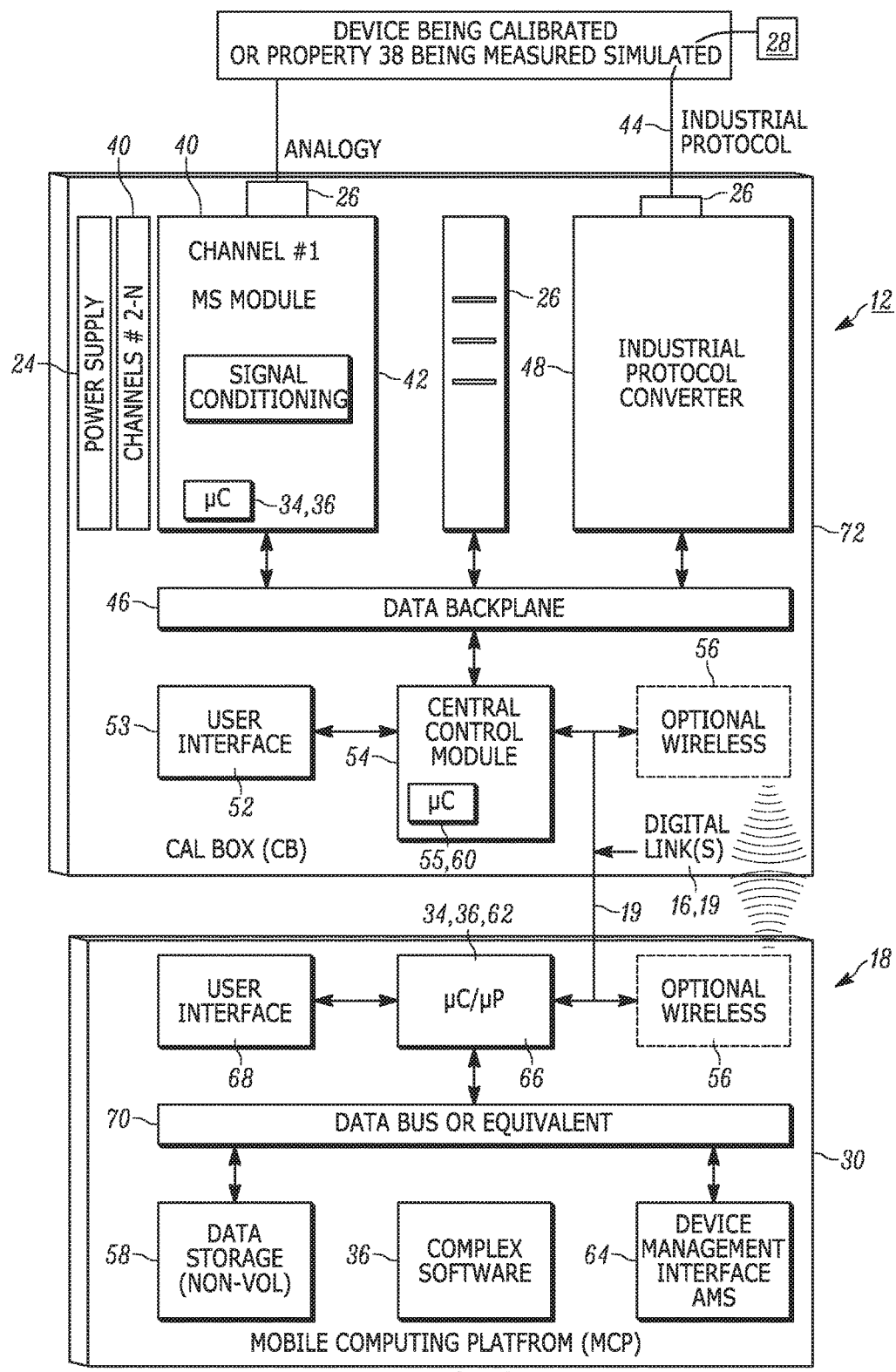
FIG. 4 is a block diagram of a calibration apparatus and mobile computing platform constructed in accordance with another example embodiment of the present disclosure.

The calibration apparatus 12, as further illustrated and described with respect to the illustrated example embodiment of the block diagram of FIG. 4 is a mobile measuring and calibrating device capable of use in controlled, industrial, harsh, and hazardous environmental conditions. The calibration apparatus 12 functions as a stand-alone (or "simple") manner as illustrated in the example embodiment of FIG. 1. Alternatively, the calibration apparatus 12 can be used as an expanded functionality (or "complex") manner as illustrated in the example embodiment of FIGS. 2 and 3, where the calibration apparatus is in communication with a mobile computing platform 18 ("MCP") that can provide documentation, data storage, analysis, computing functions, and the like. The communication link 16 between the MCP 18 and the calibration apparatus will comprise one or more digital links or streams across one or more channels embedded into both the calibration apparatus and the MCP. Examples of such digital streams include I$^2$C, UART, IEEE 802.15.4 and the like.

During operation, the calibration apparatus 12 and MCP 18 support immediate or synchronized command execution 20. The synchronized command execution 20 allows commands to be executed as received or can be queued to be triggered by another command. An example of such commands 22 that can be either executed or queued for triggering by another command by the MCP or the calibration apparatus 12 include, for example GET_SIM_VALUE, GET_MEASUREMENT, etc. Synchronized command execution is valuable when the time coherence of data (measurement or simulation) across multiple channels 40 is important.

In the illustrated example embodiments, the calibration apparatus 12 is a portable device powered by an internal power supply 24. In one example embodiment, the internal power supply 24 is a DC battery, generator, solar power, or any combination thereof. The calibration apparatus 12 further comprises a plurality of input and output (I/O) devices 26 (or I/O modules) for receiving and transmitting data typically in the form of instructions to I/O located within remote devices 30 that includes for example, remote transceiver 14 apparatuses, MCP 18, temperature transceivers and/or pressure transceivers 28, and computers 32. In the illustrated example embodiment of FIGS. 2 and 3, the remote devices 30 are capable of receiving and transmitting instructions and data to each other and to the calibration apparatus 12.

The I/O devices 26 of the calibration apparatus 12 and remote devices 30 allow not only the transmission and receipt of data, but also allow for the calibration apparatus to take measurements and execute simulations among the remote devices. The measuring and executing of simulations by the calibration apparatus 12 on the remote devices 30 is achieved by hardware, namely one or more microcontrollers and/or microprocessors 34 and the programmable software or firmware 36 programmed therein, as illustrated in FIG. 4. The hardware 34 and software/firmware 36 provide control, calibration, and traceability (to a standard, such as for example National Institute of Standards, NIST and the like), and digital communication.

In one example embodiment, the calibration apparatus 12 is capable of measuring or simulating one or more properties 38, including physical, electrical, geospatial, and/or visual properties through the remote devices 30. Some specific examples of such properties 38 that are measured or simulated further include, pressure, flow, temperature, voltage, current, humidity, frequency, location, and image.

Within the calibration apparatus 12, the properties 38 are measured by their own dedicated measurement/simulation channel 40, such as a pressure channel, frequency channel and the like. Each channel 40 comprises channel electronics 42 that may include A/D converters, signal conditioning devices, power management devices, a microprocessor, microcontroller, and the like. In an alternative example embodiment, the calibration apparatus 12 comprises a single microcontroller or microprocessor used by the plurality of channels 40. The calibration apparatus 12 communicates through the channels 40, using one or more industrial protocols 44. Examples of such industrial protocols 44 include foundation fieldbus, HART, and Profibus.

As illustrated in FIG. 4, the channels 40 communicate with a data backplane 46 to an industrial protocol converter 48 before receiving or transmitting data/instructions to sensors or actuators, for example pressure and temperature transceivers 28. The data backplane 46 acts as a databus and is coupled communication within the calibration apparatus 12 to a user interface 52, central control module (such as a microcontroller/microprocessor 34 containing software/firmware 36) and optional wireless electronics 56 for transmitting data/instructions to the remote devices 30, including the MCP 18.

In the illustrated example embodiment of FIG. 4, the calibration apparatus 12 is an electronic device that consists of the user interface 52, a central control module 54, distributed measurement/simulation channels 40, and an internal power supply 24. The calibration apparatus 12 is used for the purpose of measurement and calibration of remote devices 30, such as sensors and actuators deployed in a variety of scientific and industrial applications with high accuracy and precision. In one example embodiment, the calibration apparatus 12 is used as a "standalone" mode, where the apparatus is utilized as a complete system and functionality is limited by options available to the user via the user interface 52.

In an alternative example embodiment, the calibration apparatus 12 is used with the MCP 18 running special calibration software/firmware 36. Here the calibration apparatus 12 is a "hub" for measurement and calibration, while connected to a MCP 18. The MCP 18 may be hand held or set upon a surface, may be battery or line powered, and capable of storing data within a database 58. The MCP 18 is in communication or interfaced to the calibration apparatus 12 digitally via a wired or wireless communication link 16. The MCP 18 is also used to "unlock" advanced features (AF) 60 of only possible with the use of MCP 18 functions 62. Examples of the AF 60 include SET_SIM, RAMP, SYNC_START, etc. Examples of the MCP 18 functions 62 include SET_SIM, RAMP, SYNC_START, etc. The MCP 18 is further used to perform complex sequences, store the data in the database 58 acquired in the calibration/measurement process, and then transfer the data to an Asset Management System (AMS) 64.

In one example embodiment, the calibration apparatus 12 contains all functionality, for example 1-100. The calibration apparatus' user interface 52 may allow the user access, i.e. operation of a subset of those functions, say 1-20. While the all 100 functions can be access, i.e. operation of the entire set of functions, namely 1-100, thus unlocking functions 21-100 in the example embodiment.

Software or firmware 36 in the MCP 18 will command the calibration apparatus 12 to perform "complex" functionality by sending multiple "simple" commands to one or more channels 40. As such, the MCP 18 will execute a procedure though its microcontroller/microprocessor 66 to get measurements, set simulations, and aggregate other data (e.g. time, date, user signature) to perform a complete task through the calibration unit to remote devices 30. An example would be to perform an entire calibration, documenting (storing) the "as found" and "as left" states, and tagging this data with a date/timestamp and technician name, and storing such information within the MCP 18 after being executed by the calibration apparatus 12 in the remote devices 30.

The user interface 52 of the calibration apparatus 12 consists of a display 53 to visually show data to the user. The user interface 52 further comprises input devices (switches, buttons, touch screen, etc.) that the user can utilize to perform the basic functions (i.e. measure input or set output of: voltage, current, pressure, frequency, resistance, temperature, location, image, etc.).

The MCP 18 consists of a computer (microcontroller/microprocessor) 66 used to coordinate the measurement of the set inputs and set outputs 27 of the remote devices 30. In standalone mode, this coordination is based upon the inputs performed on the calibration apparatus' user interface 52. When in advanced mode (the calibration apparatus 12 being used with the MCP 18), the coordination of operations from the calibration apparatus 12 is based upon commands from the MCP 18 via the wired or wireless communication link 16. The central control module 54 also handles the transfer of information, data, and/or instructions along a databus 70 from the distributed I/O devices 26 (of the calibration apparatus 12) to the MCP and a user interface display 68 of the MCP.

Distributed measurement/simulation channels 40 (MS) are autonomous in nature and do not interact with any other module except the central control module 54. Each channel 40 handles a specific function integral to the design of said channel, that is, the operation of each channel is based upon the nature of the measurement/simulation type (voltage, current, pressure, temperature, etc.) performed by that channel. The channels 40 consist of one or more computers (microcontroller or microprocessor) 34, 36. All functions and calculations vital to the operation of said channels 40 are performed by the internal computer(s) 34, 36. The internal computer(s) 34, 36 communicate with the central control module 54 via the communication link (data backplane 46).

The plurality of channels 40 are isolated from each other, for the purpose of signal integrity, safety, and the like. The channels 40 may be contained within the same enclosure or housing 72 as the central control module 54 or may be pluggable or remote via a wired or wireless link. Input and output functions of the channels 40 may include: temperature, voltage (AC/DC), current (AC/DC), resistance, frequency, pressure, image capture, location capture (i.e. GPS), etc. Each channel 40 of the calibration apparatus 12 can be operated locally (via integral user interface) or remotely (via one or more digital streams) to measure or simulate.

Example embodiments of an internal power supply 24 of the calibration apparatus include the following: 1) A battery pack consisting of a one to a plurality of replaceable, non-rechargeable cells, 2) a battery pack consisting of one to a plurality of non-replaceable, rechargeable cells, or 3) a battery pack consisting of one to a plurality of replaceable, rechargeable cells, 4) AC line power conditions by a power conditioner.

The calibration apparatus 12 is designed in such a way as to be intrinsically safe. This is accomplished by (but not limited to) limiting the power to the central control module 54 or any of the distributed channels 40 to 1.25 W, housing 72 materials, circuit layout, use of encapsulation, etc.

Figure 5:
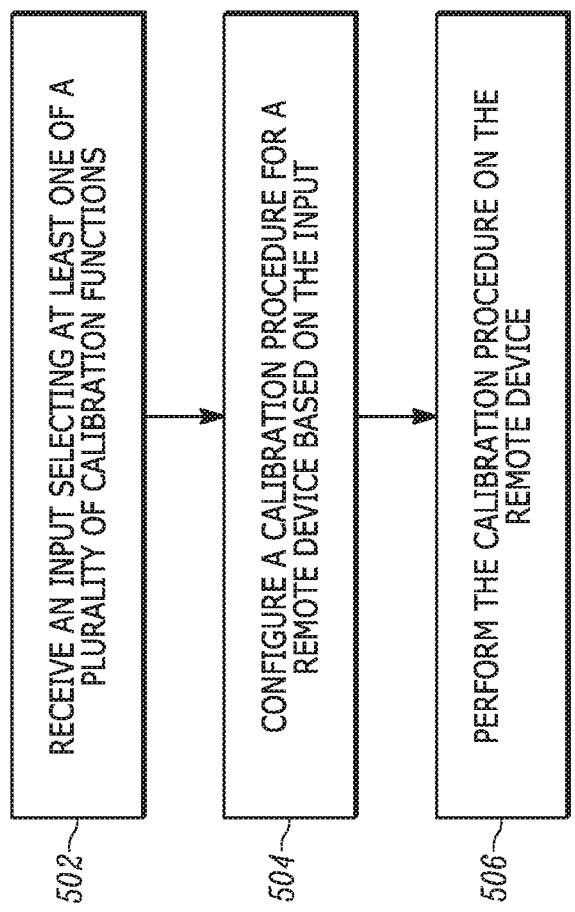
FIG. 5 is a process flow diagram of a calibration method in accordance with another example embodiment of the present disclosure.
Figure 6:
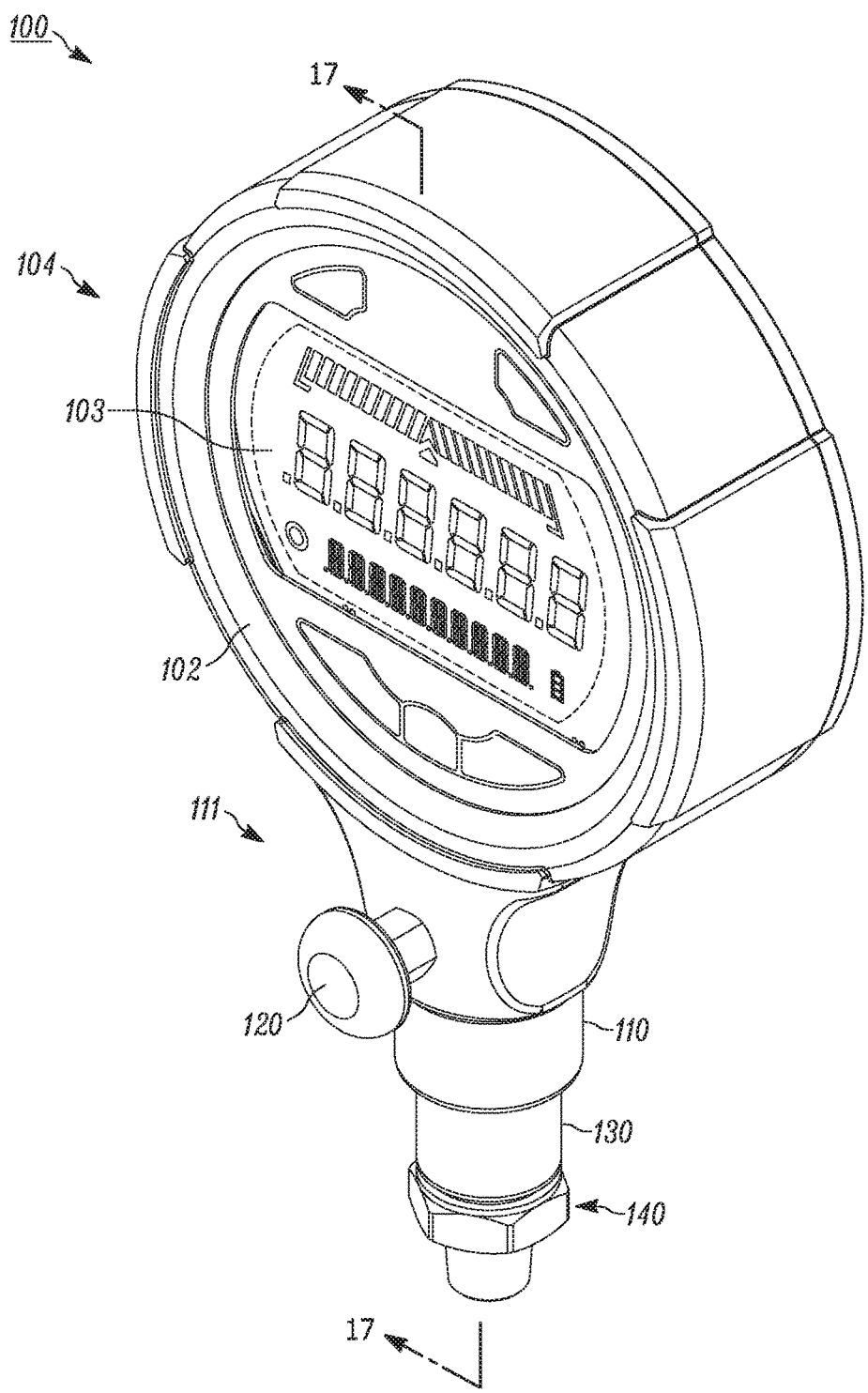
FIG. 6 is a front upper perspective view of a sensor interconnect system in accordance with one example embodiment of the present disclosure.
Figure 7:
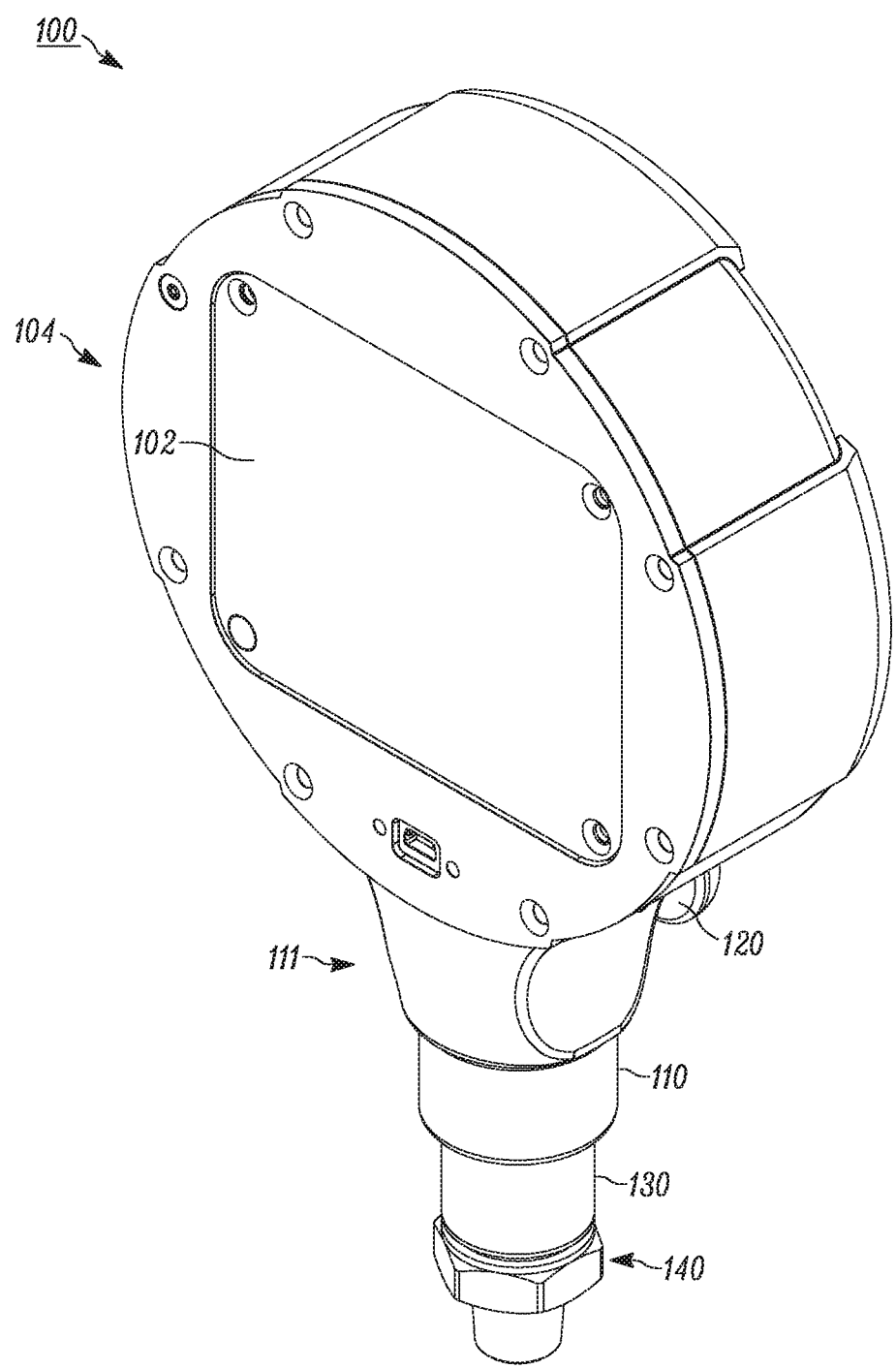
FIG. 7 is a rear upper perspective view of FIG. 6.
Figure 8:
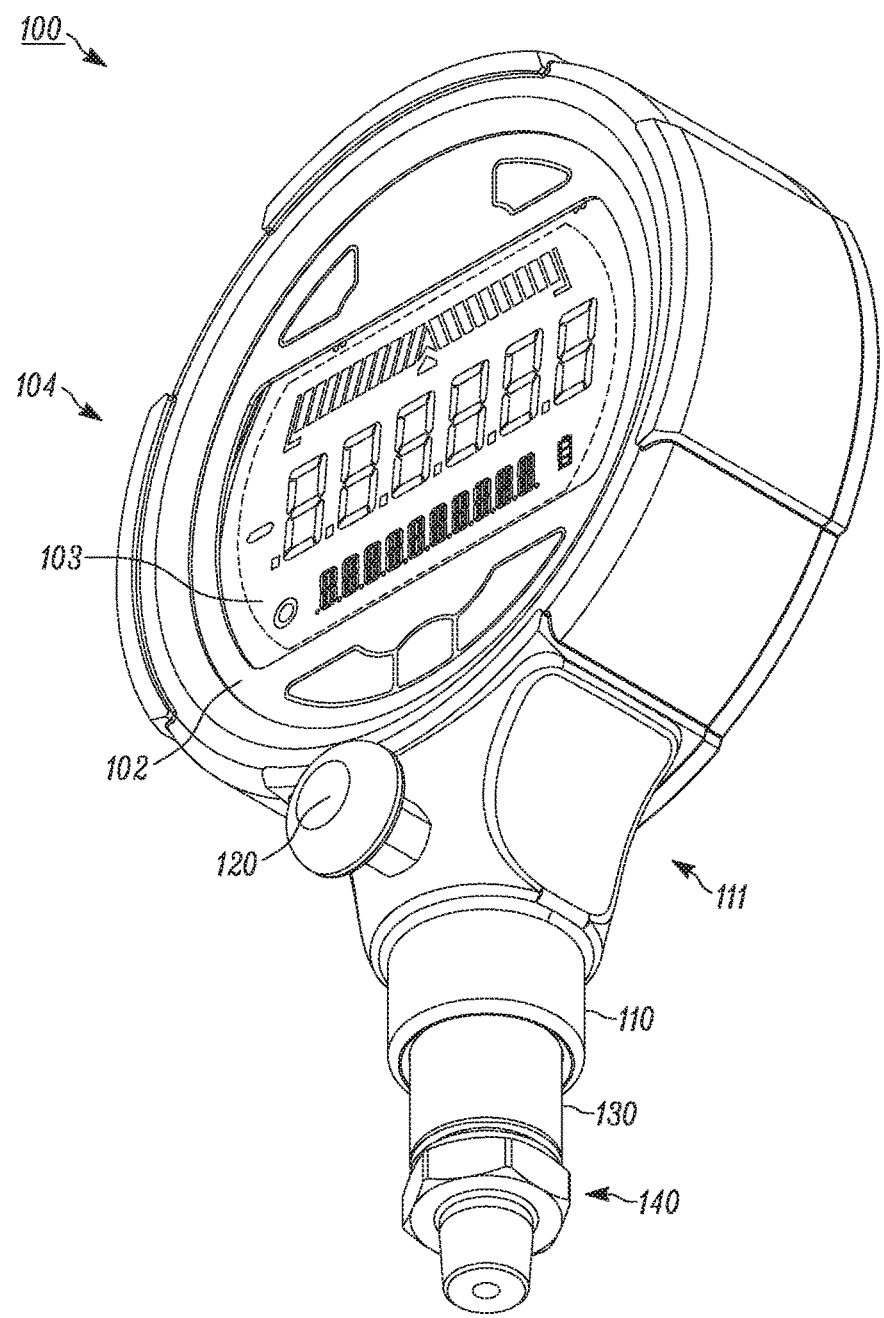
FIG. 8 is a front lower perspective view of FIG. 6.
Figure 9:
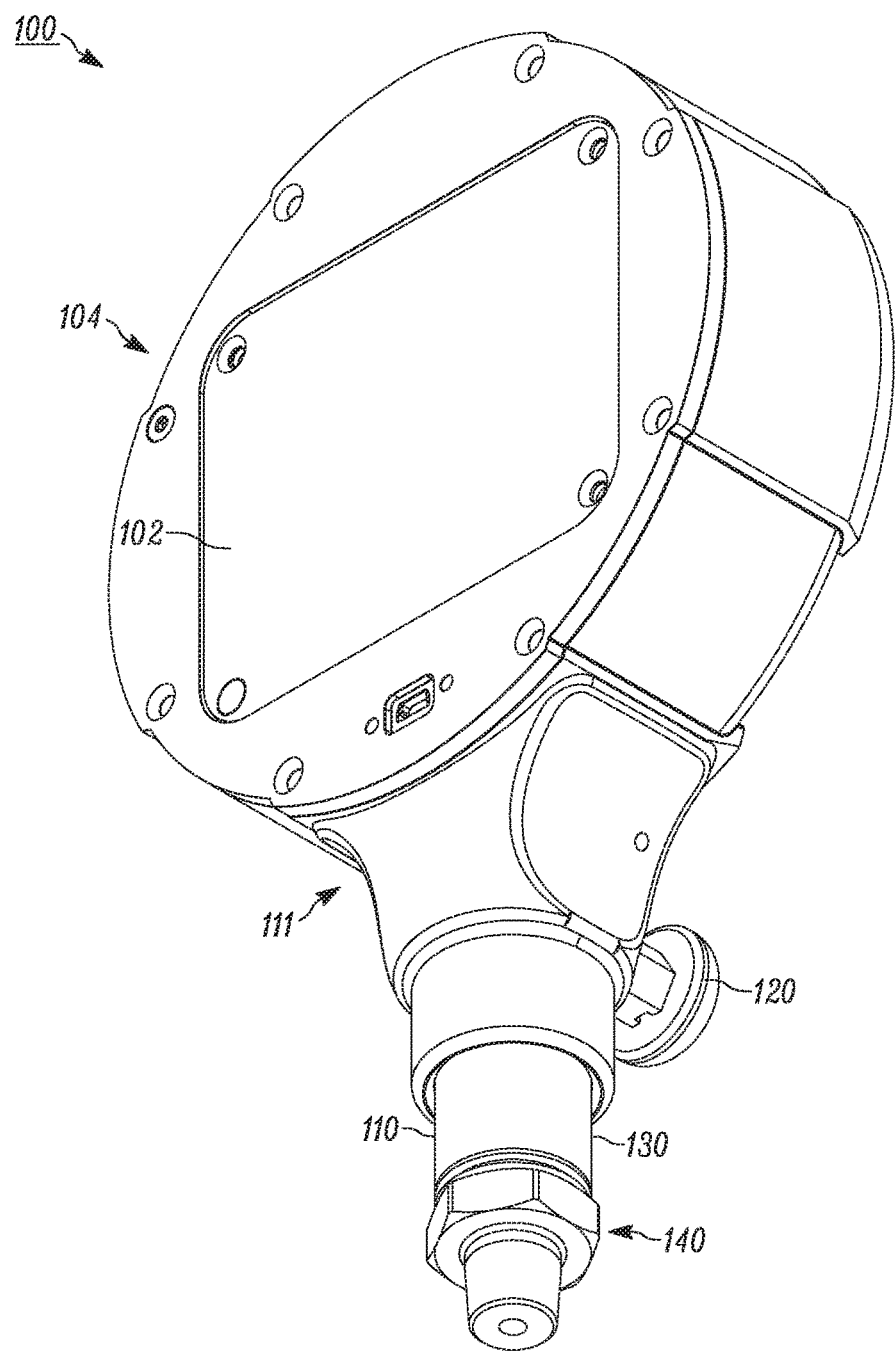
FIG. 9 is a rear lower perspective view of FIG. 6.

FIG. 5 shows a process flow diagram of an example calibration method that can be performed by the calibration apparatus 12. This method is presented as just one example of the different calibration methods that can be employed by the calibration apparatus 12. The method begins at 502, where an input can be received (e.g., by a user interface 52 of the calibration apparatus 12). The input can select at least one of a plurality of calibration functions (e.g., measurement functions, simulation functions, etc.) that the calibration apparatus 12 (or at least one I/O channel 40 of the calibration apparatus) can perform on a remote device. The method continues at 504, where a calibration procedure can be configured (e.g., by the central control module 34 of the calibration apparatus 12 and and/or by the MCP 18) based on the input. For example, the calibration procedure can be based on a plurality of inputs selecting a plurality of procedures to be performed by one or more I/O channels 40. The method ends at 506, where the calibration procedure is performed on the remote device (e.g., by the one or more I/O channels 40 of the calibration apparatus 12. For example, a portion of calibration procedure can be queried such that of commands of the calibration procedure so that they are triggered by another input and/or a result of a previous step of the calibration procedure. In another example, commands of the calibration procedure can be executed as they are received. In yet another example, one or more additional commands can be added to the calibration procedure based on a result of the performing the calibration procedure. A log can be created (e.g., by the central control module 34 of the calibration apparatus 12) of the calibration.

Referring to FIGS. 6-15, an example embodiment of a sensor interconnect system 100 is shown. The sensor interconnect system 100 includes a first connection component 104 and a second connection component 130, the second connection component coupled to a sensor 140. In one example embodiment, the sensor 140 comprises at least one of a temperature sensor, an infrared sensor, an ultrasonic sensor, a touch sensor, a proximity sensor, a pressure sensor, a fluid flow speed sensor, a level sensor, any combination thereof and the like. The sensor 140 is housed within a contained fluid sensing area 152 (see FIG. 10). In another example embodiment, the first connection component 104 comprises a head portion 102 and a tail portion 111. The head portion 102 comprises a display 103, such as a digital display, and a power source (not shown), such as a battery. In one example embodiment, the power source powers the sensor 140 and the display 103. In another example embodiment, the display 103 displays a metric indicated by the sensor 140, such as temperature, flow speed, pressure, volume, etc. inside the contained fluid sensing area 152. In another example embodiment, the contained fluid sensing area 152 is defined by a fluid container 150. The fluid container 150 comprises one of a fluid hose, a pipe, a reservoir, etc.

Figure 21A:
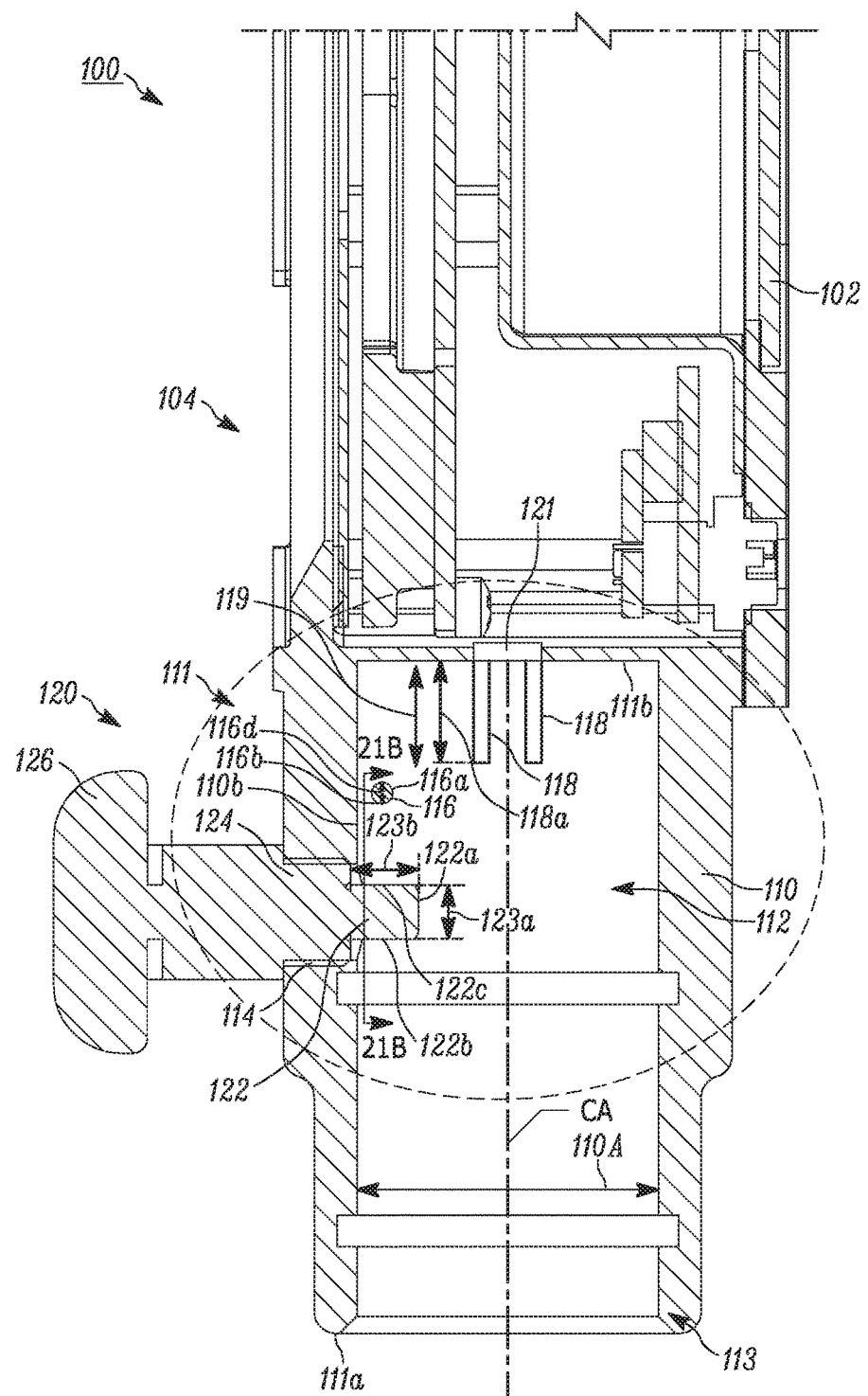
FIG. 21A is a magnified portion of FIG. 17.

As best seen in the illustrated example embodiment of FIG. 21A, the first connection component 104 comprises a cylindrical hollow body 110 defining a central open area 112 inside the tail end 111. The cylindrical hollow body 110 comprises a cylindrical diameter 110a of about 0.75" (inches) to about 1.25" (inches). It would be appreciated by one having ordinary skill in the art that the cylindrical hollow body 110 could comprise many cross-sectional shapes and sizes, including polygonal, square, rectangular, etc. In one example embodiment, the cylindrical hollow body 110 comprises a body opening 113 located at a distal end 111a of the tail portion 111. In another example embodiment, the body opening 113 has a diameter substantially equal to the cylindrical diameter 110a.

Figure 23:
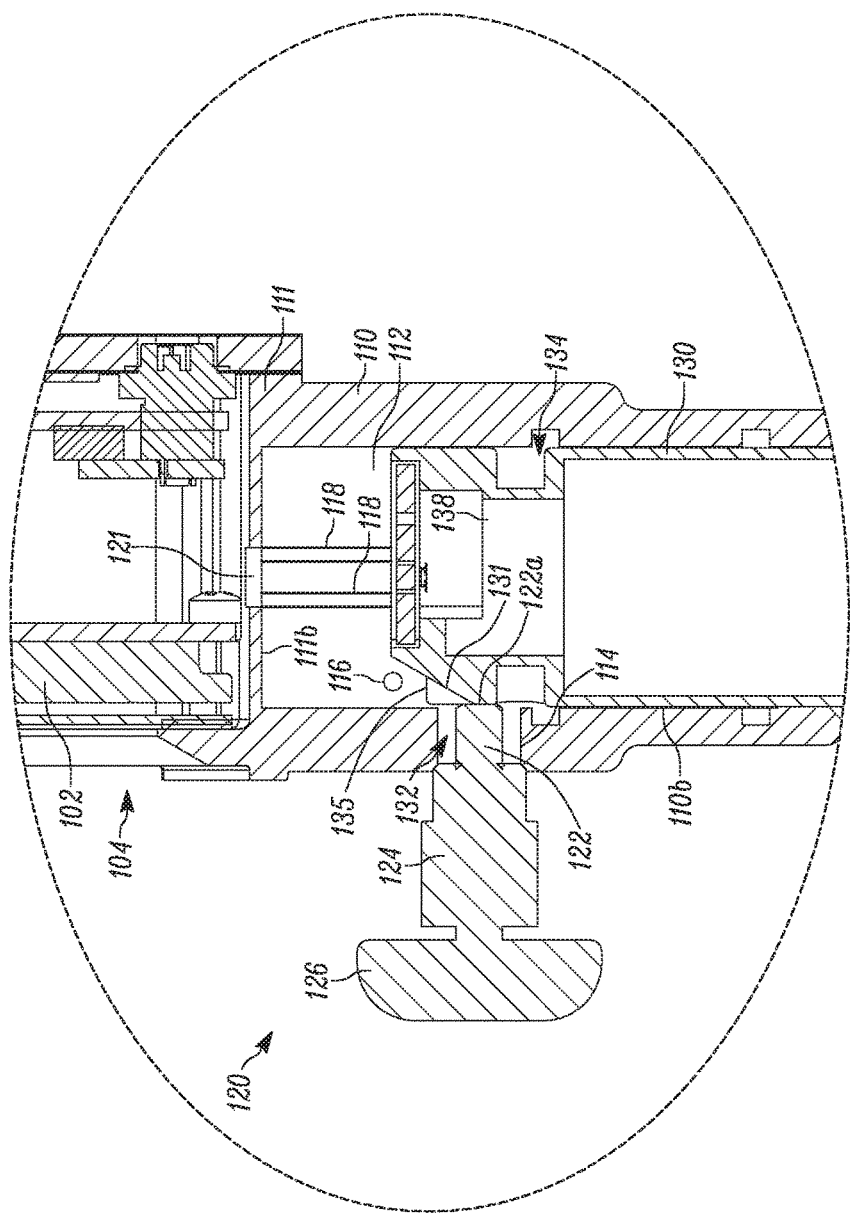
FIG. 23 is a zoomed in cross-sectional view of FIG. 17 during a later stage of assembly of a sensor interconnect system in accordance with one example embodiment of the present disclosure.

In the illustrated example embodiment of FIG. 21A, the first connection component 104 comprises a locking pin opening 114 in the tail portion 111 that houses a locking pin 120. The locking pin 120 comprises a handle portion 126, an insertion portion 124, and a locking portion 122. In one example embodiment, the locking pin 120 interacts with a locking feature 134 (see FIG. 17) of the second connection component 130 to secure a coupling of the first connection component 104 with the second connection component. The handle portion 126 resides outside the tail portion 111, the insertion portion 124 is housed, at least partially, within the locking pin opening 114, and the locking portion 122 extends into the cylindrical hollow body 110 of the tail portion. The locking pin 120 is resistively held such that at least a portion of the locking portion 122 extends into the cylindrical hollow body 110. In one example embodiment, the locking pin 120 is resistively held in place by a spring, a pneumatic force, or a hydraulic force. In another example embodiment, the locking pin 120 moves radially toward and away from the central axis CA. In yet another example embodiment, responsive to a force over a force threshold being applied to the locking pin 120 in a direction radially away from the central axis CA, the locking portion 122 is removed from the cylindrical hollow body 110 and/or a locking axial bearing surface 122a of the locking portion is moved to be co-axial with a sidewall 110b of the cylindrical hollow body 110 (see FIG. 23). Absent a force over the force threshold being applied to the locking pin 120, the locking portion 122 extends a locking distance 123b into the cylindrical hollow body 110 to prevent unintentional and/or improper insertion or removal when mated to the locking feature 134 of the second connection component 130 (see FIG. 17). In one example embodiment, the locking portion 122 comprises the locking axial bearing surface 122a, a lower locking surface 122b, and an upper locking surface 122c. In another example embodiment, the lower locking surface 122b and the upper locking surface 122c are parallel to each other. In yet another example embodiment, the locking portion 122 comprises a locking diameter or locking width 123a of about 0.10" (inches) to about 0.25" (inches).

It would be appreciated by one having ordinary skill in the art that the locking portion 122 could comprise many cross-sectional shapes and sizes, including round, square, rectangular, etc.

Figure 16:
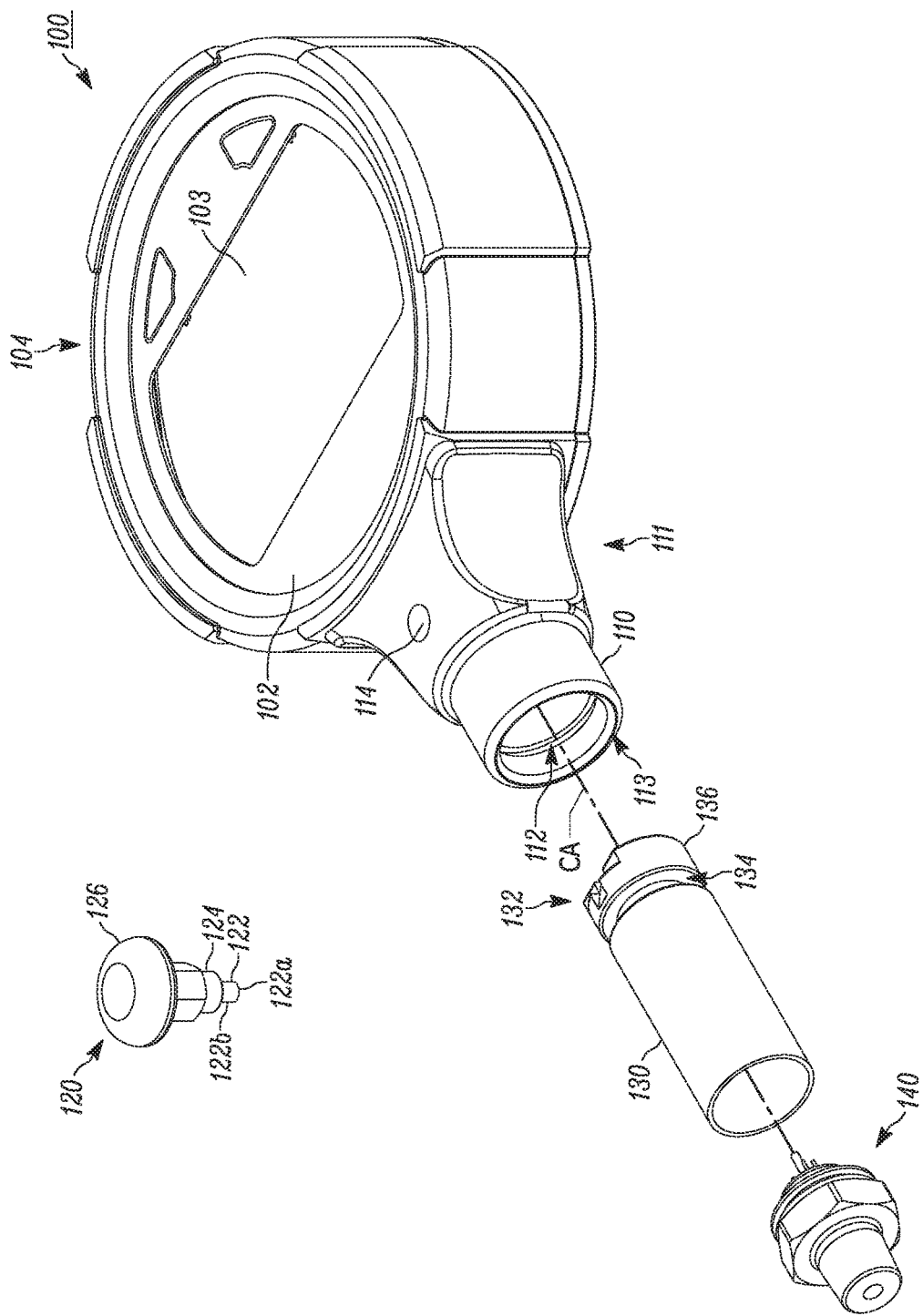
FIG. 16 is an exploded view of FIG. 6.
Figure 21B:
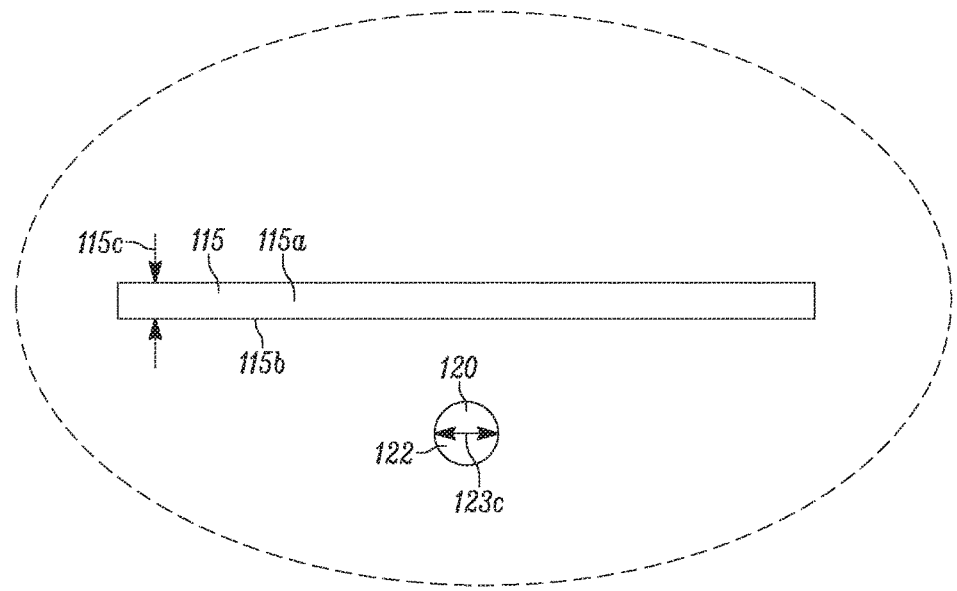
FIG. 21B is a magnified cross-sectional view of FIG. 21A along section lines 21B-21B in accordance with a first example embodiment of the present disclosure.

In one example embodiment, the cylindrical hollow body 110 is centered around the central axis CA (see FIGS. 16 and 21A). In another example embodiment, the cylindrical hollow body 110 comprises a locating pin 116 and a spring-loaded electrical contact 121 (see FIG. 21A) comprising one or more pins 118 for communicating with the display 103 of the head portion 102. The locating pin 116 prevents improper insertion, over insertion, and/or alignment of the second connection component 104 (see, for example, FIGS. 22 and 23). The locating pin 115 and/or first and second locating pins 116, 117 extend along an axis that is one of transverse or perpendicular to the central axis CA. In the illustrated example embodiment of FIG. 21B, the locating pin 115 comprises a single unitary body that extends between sidewalls 110*b* of the first connection component 104. The locating pin 116 comprises a shape that stably interacts with first and second pin ledges 133, 135, such as a shelf, a square, a slot, or alternative geometries. The locating pin 115 comprises a lower locating bearing surface 115*b* and an axial bearing surface 115*a*. In another example embodiment, the locating pin 115 has a first height or diameter 115*c* of about 0.063" (inches) to about 0.250" (inches). In an example embodiment, where the locating pin 115 is not cylindrical, the locating pin comprises a locating width 115*d* of about 0.063" (inches) to about 0.250" (inches). It would be appreciated by one having ordinary skill in the art that the locating pin 115 could comprise many cross-sectional shapes, including round, square, rectangular, etc.

Figure 21C:
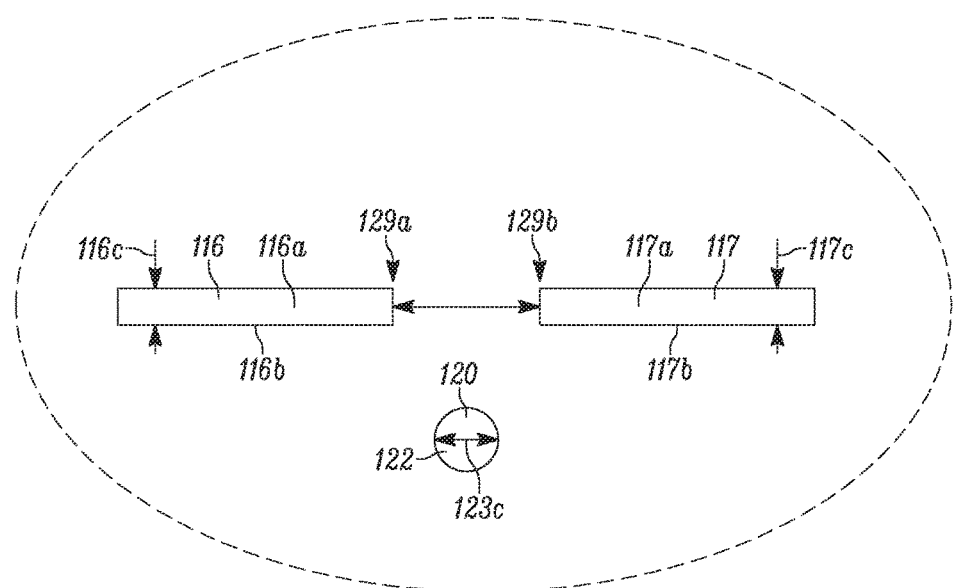
FIG. 21C is a magnified cross-sectional view of FIG. 21A along section lines 21B-21B in accordance with a second example embodiment of the present disclosure.

In the illustrated example embodiment of FIG. 21C, the first and second locating pins 116, 117 are present. In this example embodiment, a first locating pin 116 is on a first side 129*a* of the locking pin 120 and a second locating pin 117 is on a second side 129*b* of the locking pin (see FIG. 21C). The first locating pin 116 comprises a first lower locating bearing surface 116*b* and a first axial bearing surface 116*a*. In one example embodiment, the second locating pin 117 comprises a second lower locating bearing surface 117*b* and a second axial bearing surface 117*a*. In another example embodiment, the first locating pin 116 has a first height or diameter 116*c* of about 0.063" (inches) to about 0.250" (inches), and the second locating pin 117 has a second height or diameter 117*c* of about 0.063" (inches) to about 0.250" (inches). In an example embodiment, where the first and second locating pins 116, 117 are not cylindrical, the first and second locating pins comprise a locating width 116*d* of about 0.063" (inches) to about 0.250" (inches). It would be appreciated by one having ordinary skill in the art that the first and second locating pins 116, 117 could comprise many cross-sectional shapes and sizes, including round, square, rectangular, etc.

The one or more pins 118 of the spring-loaded electrical contact 121 are located on a proximal end 111*b* of the tail portion 111. In one example embodiment, the one or more pins 118 of the spring loaded electrical contact 121 extend along an axis that is at least one of transverse or parallel to the central axis CA. In another example embodiment, the one or more pins 118 compress into and extend out of the spring loaded electrical contact 121 parallel to axis 119, which is parallel to the central axis CA or along the central axis. Absent a compressive force, the one or more pins 118 extend an uncompressed distance 118*a* into the cylindrical hollow body 110, wherein the uncompressed distance is about 0.325" (inches) to about 0.40" (inches) (see FIG. 21A).

Figure 17:
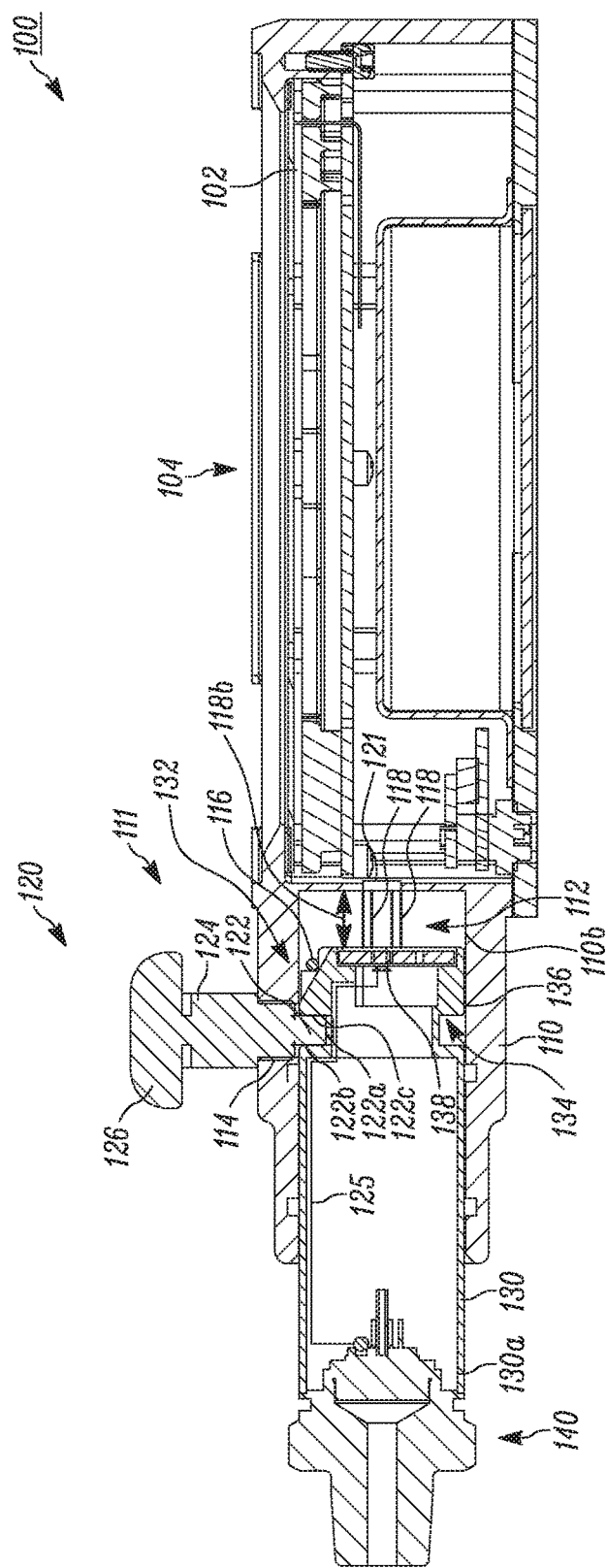
FIG. 17 is a cross-sectional view of FIG. 6 along section lines 17-17.
Figure 18:
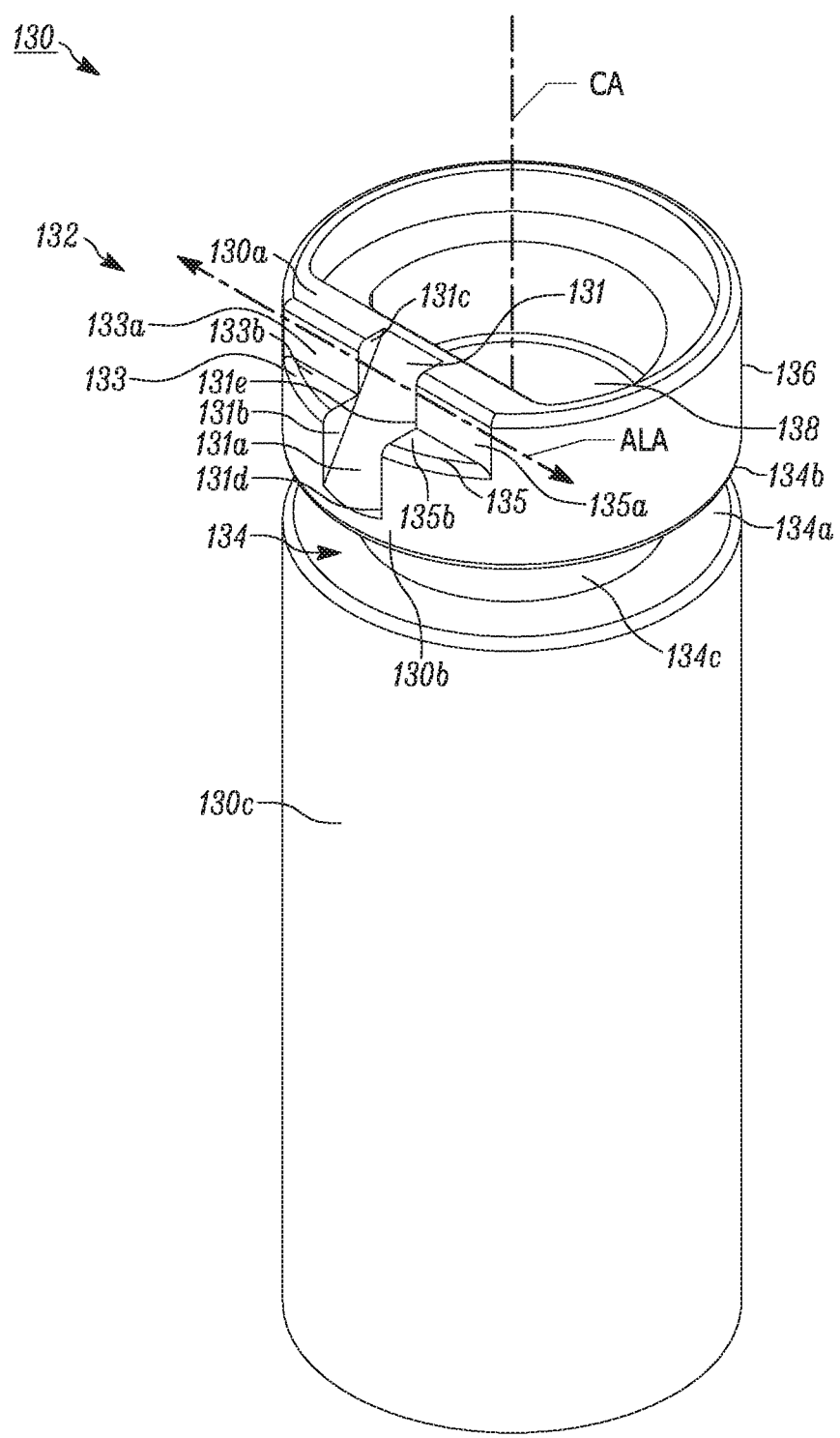
FIG. 18 is a perspective view of a second connection component of a sensor interconnect system in accordance with one example embodiment of the present disclosure.

In the presence of the compressive force, the one or more pins 118 extend a compressed distance 118*b* into the cylindrical hollow body 110, wherein the compressed distance is about 0.235" (inches) to about 0.39" (inches) (see FIG. 17). In one example embodiment, the spring-loaded electrical contact 121 and/or the one or more pins 118 are electrically connected to the power source located in the first connection component 104 to provide power to the sensor 140 when in use.

In the illustrated example embodiment of FIGS. 11-20B, the second connection component 130 comprises an alignment feature 132, the locking feature 134, and a second electrical contact 138. The second connection component 130 is centered around the central axis CA. In one example embodiment, the second connection component 130 is electrically connected 125 to the sensor 140. It would be appreciated by one having ordinary skill in the art, that though the electrical connection 125 is illustrated as following the sidewall 110*b* of the cylindrical hollow body 110, other paths and/or means are connection are contemplated. In one example embodiment, the second connection component 130 comprises a cylindrical body 136 interrupted by the locking feature 134 and the alignment feature 132. In another example embodiment, the first connection component 104 houses the second connection component 138 within the hollow cylindrical body 110. It would be appreciated by one having ordinary skill in the art that the shape of the body of the second connection component 130 corresponds to the shape of the first connection component 104, for example, responsive to the second connection component 130 comprising a square shape, the hollow body of the second connection component would likewise comprise a square shape to create a natural mating fit. In one example embodiment, an outer diameter of the second connection component 130 is substantially equal to the cylindrical diameter 110*a* of the hollow cylindrical body 110.

In one example embodiment, the alignment feature 132 comprises an inclined plane forming an alignment ramp 131 and the first and second pin ledges 133, 135. In another example embodiment, the alignment ramp 131 comprises one or more alignment sidewalls 131*b*, 131*c*, 131*d*, and 131*e* that are separated or spaced an alignment distance 139 from each other. The one or more alignment sidewalls 131*b*-131*e* correspond to the shape of the first and second pin ledges 133, 135. In one example embodiment, the alignment distance 139*a* is greater than or equal to the locking diameter 123*a* of the locking portion 122 (see FIG. 21A). In another example embodiment, the alignment ramp 131 is located between the first pin ledge 133 and the second pin ledge 135. In yet another example embodiment, the alignment ramp 131 extends away from the central axis CA and toward the sensor 140 between about a 30° to about a 75° angle. As seen in the illustrated example embodiment of FIG. 18, the alignment ramp 131 extends from a top surface 130*a* of the second connection component 130 to an upper sidewall 130*b* of the second connection component, wherein the upper sidewall is between the alignment feature 132 and the locking feature 134. In one example embodiment, the alignment ramp 131 extends in a radial direction (e.g., away from and perpendicular to the central axis CA) a radial alignment distance 139*b* (see FIG. 20B). In this example embodiment, the radial alignment distance 139*b* is substantially equal to or greater than the locking distance 123*b* (see FIG. 21A). It would be appreciated by one having ordinary skill in the art that the alignment feature 132 and the alignment ramp 131 could comprise many alternate geometries, such as geometries that would ease alignment and insertion of the first and second connection components 104, 130.

As seen in the illustrated example embodiment of FIGS. 18-20B, the first and second pin ledges 133, 135 are aligned along a first longitudinal axis ALA. The first pin ledge 133 comprises a first axial ledge bearing surface 133a and a first lower ledge bearing surface 133b. The first axial ledge bearing surface 133a extends along and forms a first plane and the first lower ledge bearing surface 133b extends along and forms a second plane. In one example embodiment, the first plane is transverse or perpendicular to the second plane. In another example embodiment, the first and second pin ledges 133, 135 comprise a pin ledge height 141a (see FIG. 20A), wherein the pin ledge height is greater than, less than, or equal to at least one of the height or diameter 115c of the locating pin 115, or the first height or diameter 116c and/or the second height or diameter 117c of the first and second locating pins 116, 117, respectively (see FIGS. 21B-21C). Additionally, the first and second pin ledges 133, 135 comprise a pin ledge width 141b (see FIG. 20B), wherein the pin ledge width is greater than, or equal to the diameter 115c of the locating pin 115 or, the first diameter 116c, the second diameter 117c, and/or the locating width 116d of the first and second locating pins 116, 117, respectively (see FIGS. 21B-21C). In one example embodiment, an alignment/lock distance 153 (see FIG. 20A) is equal to a distance between the upper locking surface 122c of the locking pin 120 and the locating lower surface 115b of the locking pin 115, or the first and second locating lower surfaces 116b, 117b of the first and second locking pins 116, 117 (see FIGS. 21B-21C). In one example embodiment, the alignment/lock distance 153 is between 0.20" (inches) and 0.40" (inches). In another example embodiment, the alignment/lock distance 153 comprising a complementary distance between the upper locking surface 122c of the locking pin 120 and the locating lower surface 115b of the locking pin 115 prevents over insertion of the second connection component 130 into the first connection component 104, preventing the one or more pins 118 from being over compressed and/or damaged.

In the illustrated example embodiment, the first axial ledge bearing surface 133a is separated from the top surface 130a by a beveled edge. Likewise, the first lower ledge bearing surface 133b is separated from the upper sidewall 130b by a beveled edge. It would be appreciated by one having ordinary skill in the art that other types of edges (e.g., not beveled) are contemplated. The second pin ledge 135 mirrors the first pin ledge 133 across the alignment ramp 131. Wherein, the second pin ledge 135 comprises a second axial ledge bearing surface 135a and a second lower ledge bearing surface 135b that are substantially mirror images of the first axial ledge bearing surface 133a and the first lower ledge bearing surface 133b.

As seen in the illustrated example embodiment of FIGS. 18-20B, the locking feature 134 comprises a radial annular indention in the cylindrical body 136 of the second connection component 130. In the illustrated example embodiment, the locking feature 134 radially encircles the second connection component 130. The locking feature 134 is centrally and symmetrically located about the central axis CA. The locking feature 134 comprises a lower bearing surface 134a, an upper bearing surface 134b, and an axial bearing surface 134c. In one example embodiment, the lower, upper, and axial bearing surfaces 134a-134c are substantially planar, and the upper and lower bearing surfaces 134a, 134b are perpendicular to the axial bearing surface 134c. In another example embodiment, the axial bearing surface 134c is transverse to the upper and lower bearing surfaces 134a, 134b. In this example embodiment, the locking axial bearing surface 122a of the locking portion 122 comprises an angle that is complementary to the angle of the axial bearing surface 134c. In the illustrated example embodiment, the upper bearing surface 134b is separated from the upper sidewall 130b by a beveled edge. Likewise, the lower bearing surface 134a is separated from a lower sidewall 130c of the second connection component 130 by a beveled edge. It would be appreciated by one having ordinary skill in the art that other types of edges (e.g., not beveled) are contemplated.

Figure 19:
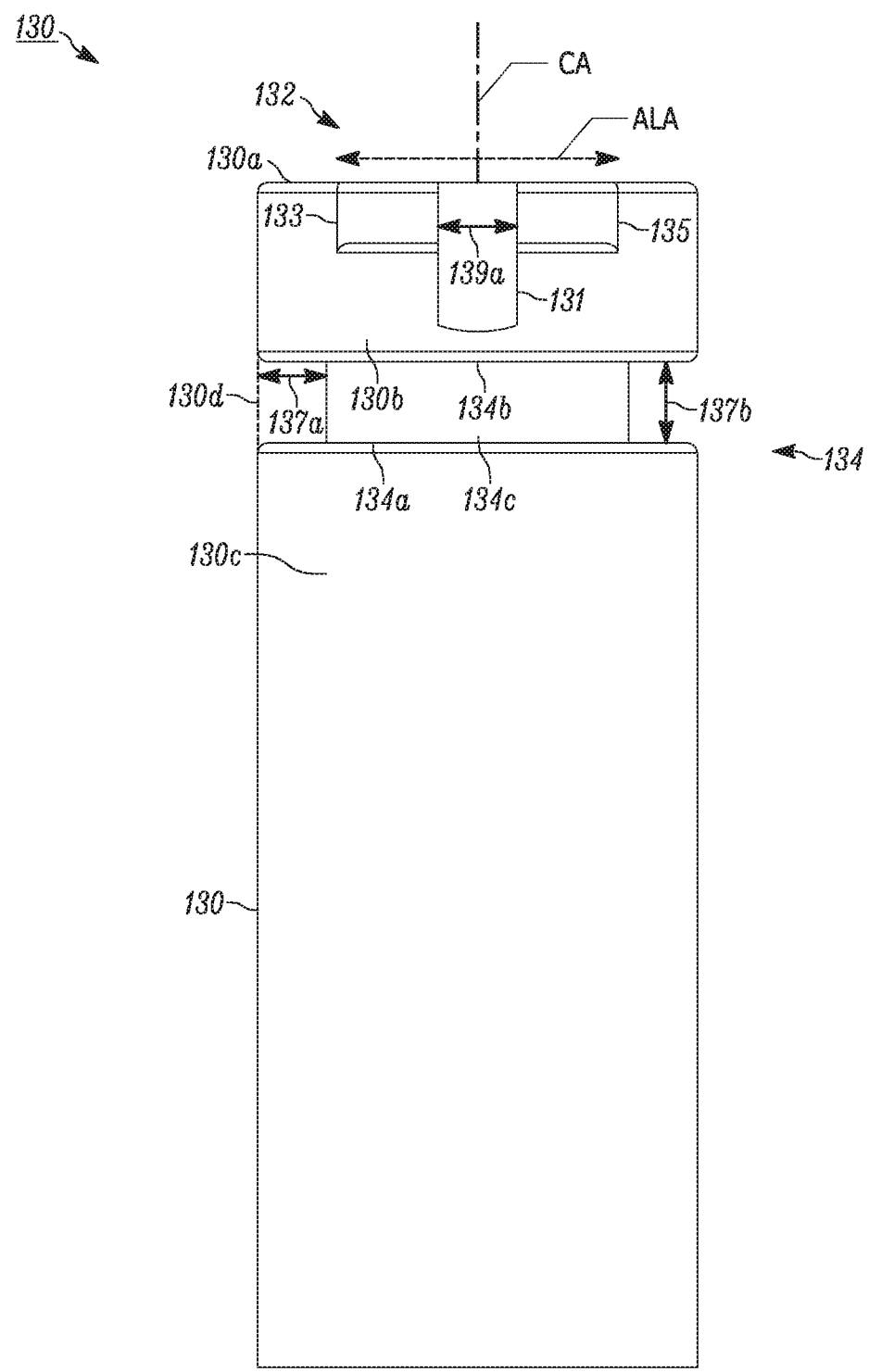
FIG. 19 is a front elevation view of FIG. 18.
Figures 20A, 20B:
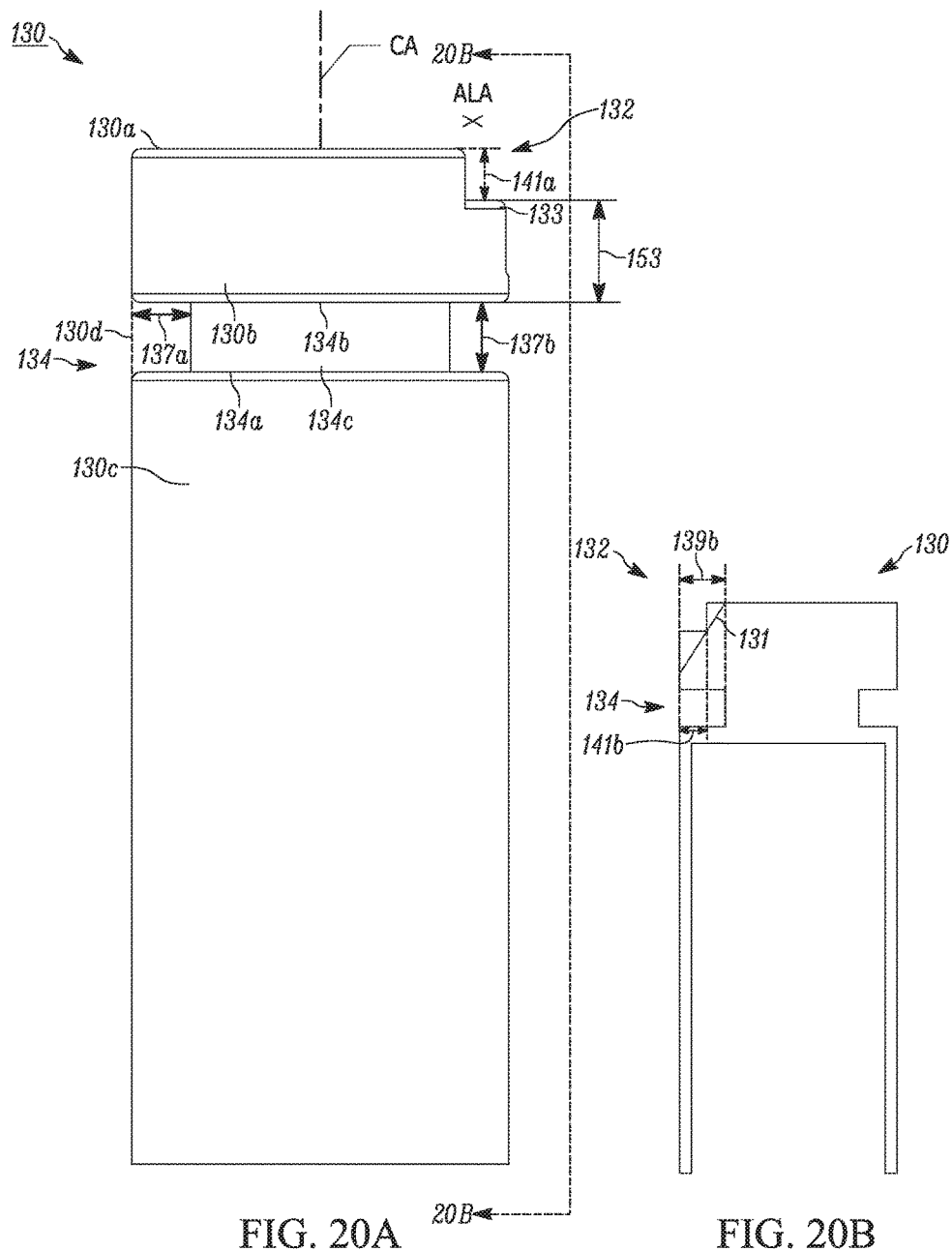
FIG. 20A is a left side elevation view of FIG. 18.
FIG. 20B is a cross-section view of FIG. 20A along section lines 20B-20B.

In the illustrated example embodiment of FIG. 19, the axial bearing surface 134c is an axial annular indentation distance 137a from a plane 130d that extends along the upper and lower sidewalls 130b, 130c. In one example embodiment, the axial indentation distance 137a is less than, equal to, or greater than the locking distance 123b (see FIG. 21A). In another example embodiment, the upper and lower bearing surfaces 134b, 134a are separated an indentation distance 137b. In this example embodiment, the indentation distance 137b is substantially equal to or greater than the locking diameter or locking width 123a (see FIG. 21A).

Figure 10:
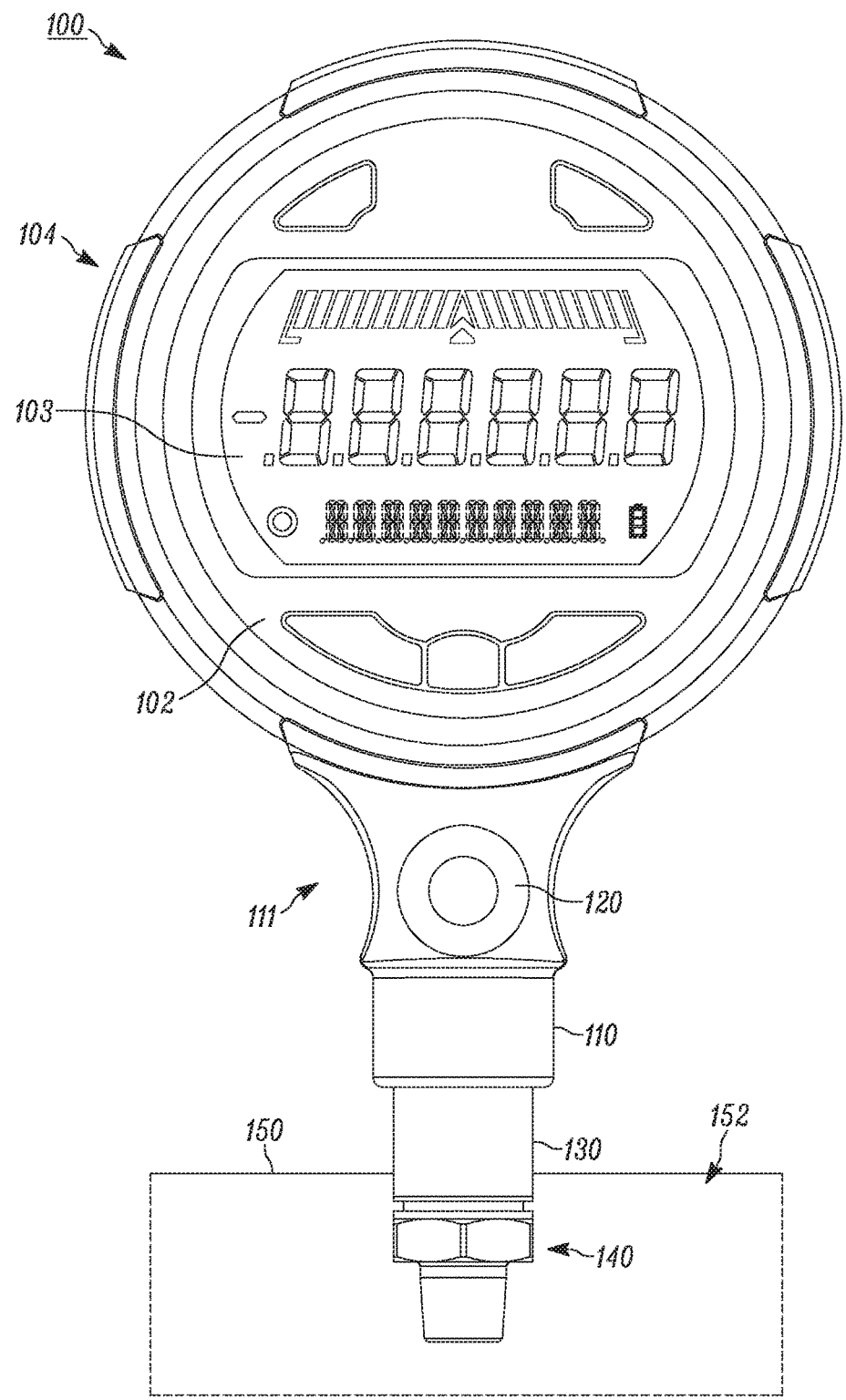
FIG. 10 is a front elevation view of FIG. 6 while the sensor interconnect system is in use.
Figure 11:
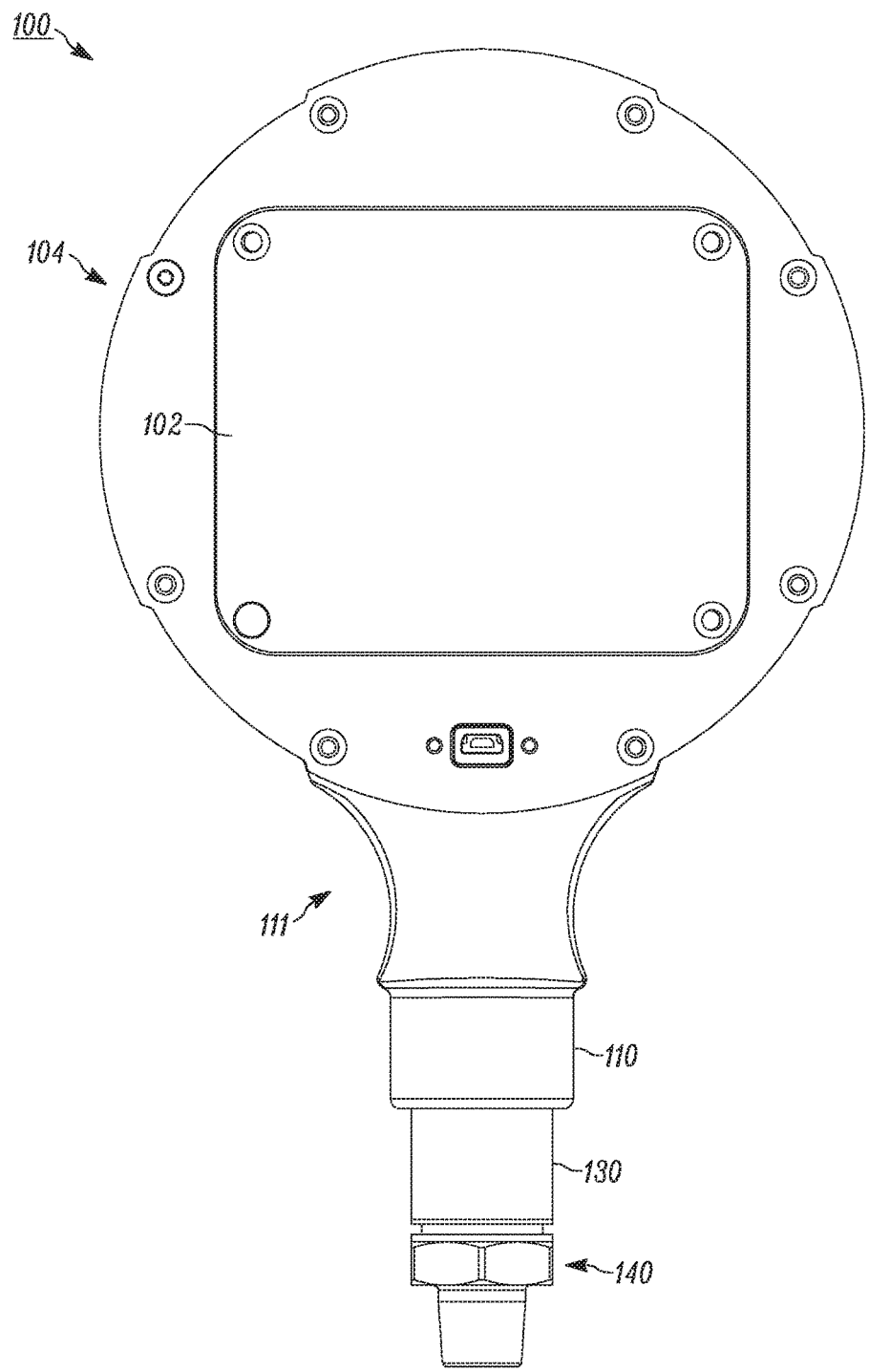
FIG. 11 is a rear elevation view of FIG. 6.
Figures 12, 13:
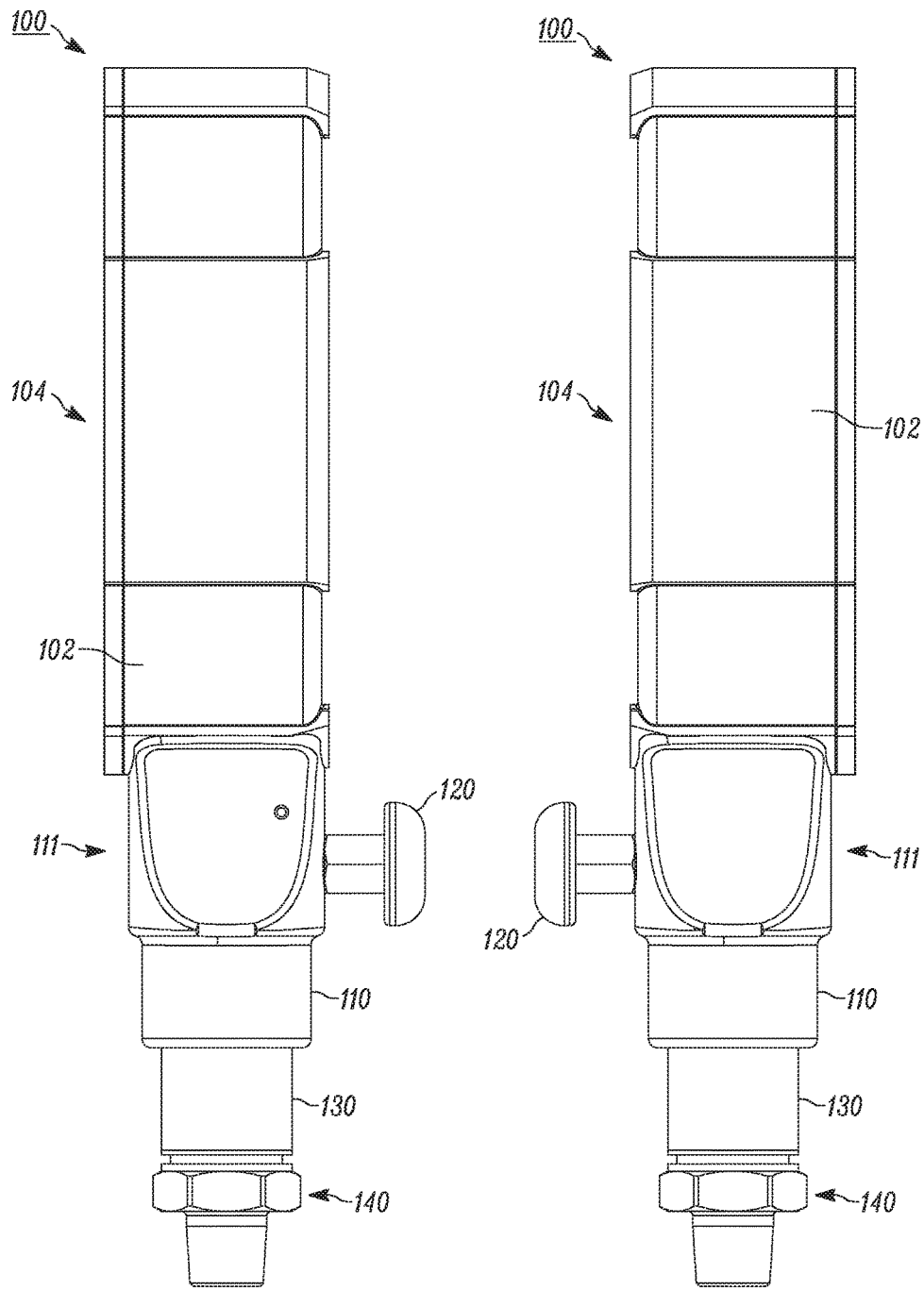
FIG. 12 is a right side plan view of FIG. 6.
FIG. 13 is a left side plan view of FIG. 6.
Figure 14:
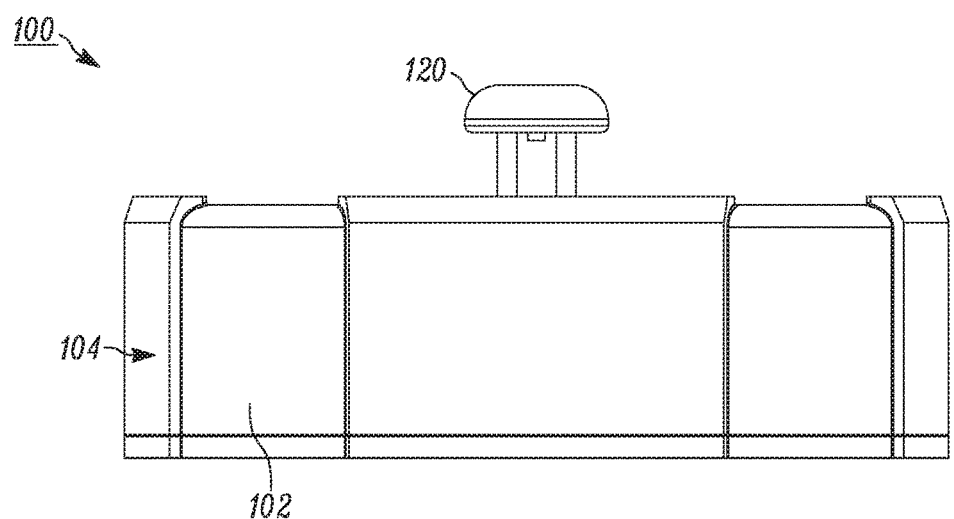
FIG. 14 is a top plan view of FIG. 6.
Figure 15:
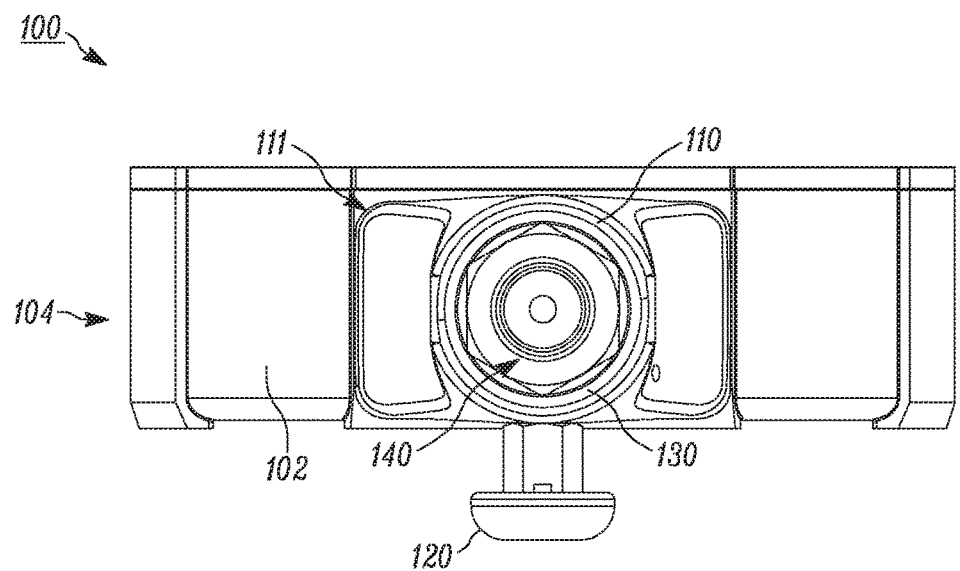
FIG. 15 is a bottom plan view of FIG. 6.

In one example embodiment, the second connection component 130 transects the fluid container 150, as shown in FIG. 10, such that the sensor 140 is inside the fluid sensing area 152 and an upper portion of the second connection component is outside the fluid container. In another example embodiment, a seal houses the second connection component 130, such that the fluid container 150 remains a sealed container, that is the fluid container remains fluid (liquid) and/or gas tight when the second connection component is present.

Figure 22:
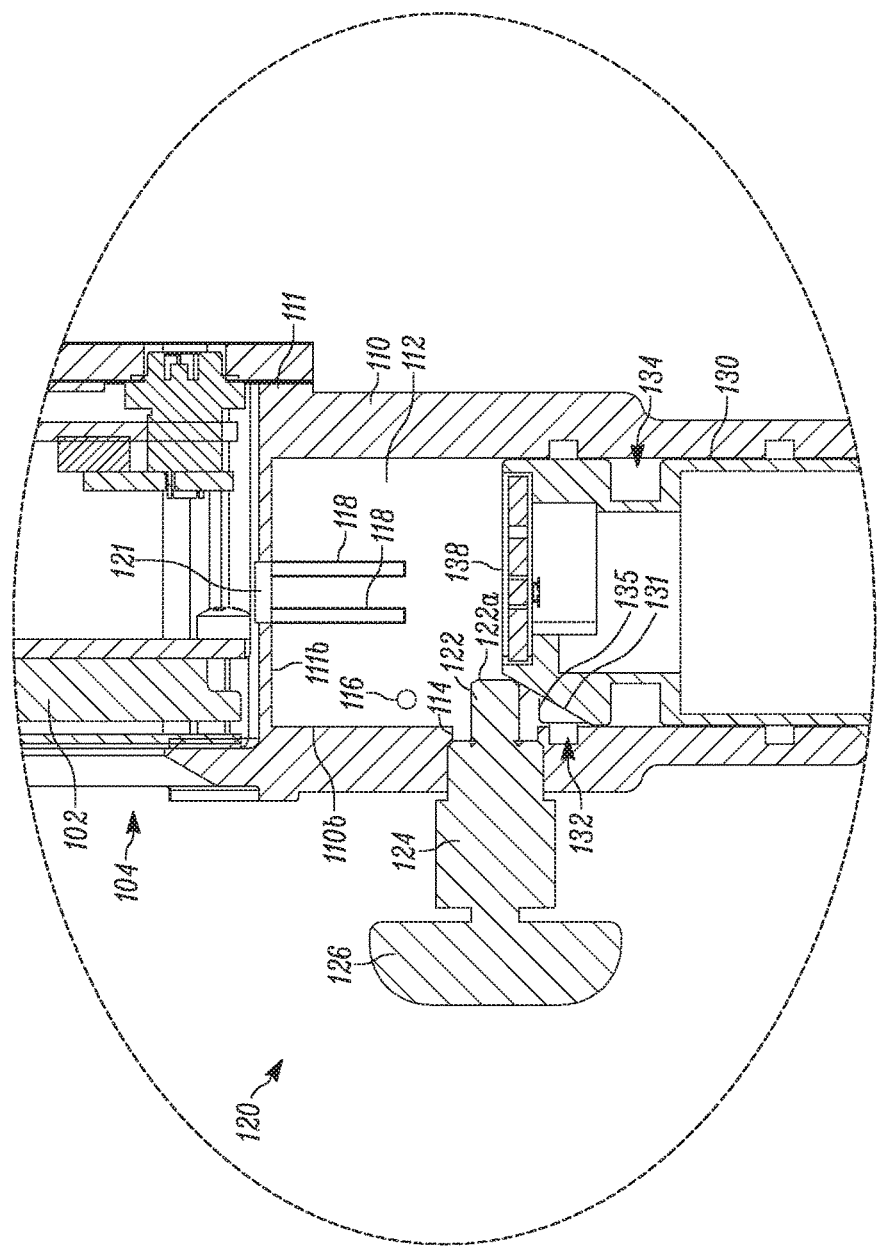
FIG. 22 is a magnified cross-sectional view of FIG. 17 during an earlier stage of assembly of a sensor interconnect system in accordance with one example embodiment of the present disclosure.

In the illustrated example embodiment of FIG. 22, the second connection component 130 is inserted through the body opening 113 of the first connection component 104 into the cylindrical hollow body 110. Responsive to the locking portion 122 of the locking pin 120 being coaxial with the alignment ramp 131, the locking axial bearing surface 122a of the locking feature interacts with a most centrally located (e.g., nearest the central axis CA) portion of the alignment ramp. Responsive to the locking portion 122 of the locking pin 120 not being coaxial with the alignment ramp 131, the locking lower bearing surface 122b of the locking feature interacts with the top surface 130a of the second connection component 130, preventing the insertion of the second connection component into the first connection component 104. The first connection component 104 can be rotated relative to the second connection component 130 until the locking pin 120 is coaxial with the alignment ramp 131.

Once aligned, a user will feel a tactile sensation as the second connection component 130 advances into the first connection component 104. The force applied to advance the second connection component 130 into the first connection component 104 along the central axis CA will, additionally, push the locking pin 120 away from the center axis CA, as the locking axial bearing surface 122a interacts with the alignment ramp 131. The alignment ramp 131 will push the locking pin 120 away from the central axis CA until the locking portion 122 is displaced from the cylindrical hollow body 110 and/or the locking axial bearing surface 122a of the locking portion is moved to be co-axial with the sidewall 110b of the cylindrical hollow body 110 (see FIG. 23). The locking axial bearing surface 122a will contact the upper sidewall 130b, before extending into the locking feature 134.

Once the alignment ramp 131 of the second connection component 130 advances past the locking pin 120, the locking pin advances into the locking feature 134 to maintain a lateral position of the first connection component 104 relative to the second connection component 130. In an example embodiment, at least one of the first or second pin ledges 133, 135 contacts at least one of the locating pin(s) 115, 116, 117 to maintain a rotational position of the first connection component 104 relative to the second connection component 130. Additionally, by limiting insertion of the second connection component 130 to merely when the locking pin 120 and the alignment ramp 131 are co-axial and the locating pin(s) 115, 116, 117 are substantially rotationally aligned with the first and second pin ledges 133, 135, a proper alignment of the one or more pins 118 of the spring loaded electrical contact 121 relative to the second electrical contact 138 of the second connection component 130 is assured. The locking pin 120, the alignment ramp 131, and the locating pin(s) 115, 116, 117, work in tandem to assure proper alignment of the one or more pins 118 with the second electrical contact 138 of the second connection component 130, such that the one or more pins do not come into physical or electrical contact with the second electrical contact absent proper alignment along multiple geometric axes.

In one example embodiment, the interaction of the upper locking surface 122c of the locking pin 120 and the upper bearing surface 134b of the locking feature 134 of the second connection component 130 pushes the first and second lower ledge bearing surfaces 133b, 135b of the first and second pin ledges 133, 135 into contact with the lower locating bearing surface(s) 115b, 116b, 117b of the locking pin(s) 115, 116, 117. Further, the interaction of the upper and lower locking surfaces 122c, 122b of the locking pin 120 with the upper and lower bearing surfaces 134b, 134a of the locking feature 134 prevents lateral movement of the first connection component 104 relative to the second connection component 130.

In another example embodiment, the interaction of the axial locking surface 122a of the locking pin 120 and the axial bearing surface 134c of the locking feature 134 of the second connection component 130 along with an interaction between sidewalls 130b, 130c of the second connection component and interior sidewalls 110b of the first connection component 104 pushes the first and second axial ledge bearing surfaces 133a, 135a of the first and second pin ledges 133, 135 into contact with the locating axial surface(s) 115a, 116a, 117a of the locking pin(s) 115, 116, 117. Further, the locking pin(s) 115, 116, 117 prevent over insertion of the second connection component 130 into the first connection component 104, even absent the locking pin 120, such as when the locking pin 120 has been pulled away from the central axis CA for removal.

Further, the interaction of the first and second axial ledge bearing surfaces 133a, 135a of the first and second pin ledges 133, 135 with the locating axial surface(s) 115a, 116a, 117a of the locking pin(s) 115, 116, 117 prevents rotational movement of the first connection component 104 relative to the second connection component 130. Additionally, the interaction of the first and second lower ledge bearing surfaces 133b, 135b of the first and second pin ledges 133, 135 with the locating lower surface(s) 115b, 116b, 117b of the locking pin(s) 115, 116, 117 prevents askewed movement of the first connection component 104 relative to the second connection component 130.

Advantageously, the above interactions make a relative position of the spring loaded electrical contact 121 relative to the second electrical contact 138 known, such that the one or more pins 118 of the spring loaded electrical contact can be positioned to interact with various points on the second electrical contact 138, to ensure proper electrical conductivity and connection between the first and second connection components 104, 130. In one example embodiment, one or more pins 118 are electrically connected to the power source and connect via the second connection component 130 to the sensor 140. In another example embodiment, first and second pins 118 comprise a power source, a third pin comprises a first digital signal from the sensor 140 corresponding to a first sensed condition to be viewed or seen on the display 103, and a fourth pin comprises a second digital signal from the sensor 140 corresponding to a second sensed condition to be viewed or seen on the display. In this example, the one or more pins 118 can be configure to interact with the desired contact. Further, because the positions are maintained, the second connection component 130 will not be over inserted, thus damaging the spring loaded electrical contact 121.

During removal, when the locking pin 120 is pulled out of the locking feature 134 (e.g., via the handle portion 126), the first connection component 104 is easily separated from the second connection component 130, as the alignment ramp 131 prevents a snap back of the locking pin 120 from being jarring. Additionally, because the second connection component 130 is housed within the fluid container 150 (see FIG. 10), the fluid container does not need to be breached to utilize the sensor 140, or to determine an internal condition of the fluid container.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected or in contact, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A sensor interconnect system comprising:
a first connection component comprising a locking pin, a locating pin, and a spring loaded electrical contact comprising at least one contact pin; and
a second connection component comprising an alignment feature, a locking feature, and a second electrical contact, the second connection component coupled to a sensor located in a contained fluid sensing area, wherein, when assembled, the locking pin interacts with the locking feature to maintain a lateral position of the first connection component relative to the second connection component, the locating pin interacts with the alignment feature to maintain a rotational position of the first connection component relative to the second connection component, and wherein, the at least one contact pin of the spring loaded electrical contact is in electrical communication with the second electrical contact.

2. The sensor interconnect system of claim 1, wherein the second connection component comprises a cylindrical body interrupted by the locking feature and the alignment feature and the first connection component comprises a hollow cylindrical body, wherein the first connection component houses the second connection component within the hollow cylindrical body when assembled.

3. The sensor interconnect system of claim 1, the alignment feature comprises an alignment ramp and first and second pin ledges, the alignment ramp comprises first and second alignment sidewalls that are separated an alignment distance from each other, the alignment distance is greater than or equal to a locking width of the locking pin, the alignment ramp located between the first pin ledge and the second pin ledge.

4. The sensor interconnect system of claim 3, wherein, the first and second pin ledges are aligned along a first longitudinal axis, and have lower ledge bearing surfaces and axial ledge bearing surfaces, wherein at least one of the first or second pin ledges contacts the locating pin.

5. The sensor interconnect system of claim 1, the locking feature comprises a radial indentation having upper, lower, and axial bearing surfaces.

6. The sensor interconnect system of claim 5, wherein the locking pin interacts with at least one of the upper, lower, and axial bearing surfaces when assembled.

7. The sensor interconnect system of claim 3, wherein responsive to aligning the locking pin with the alignment ramp the locking pin moves radially away from a central axis as the second connection component is inserted into the first connection component, and responsive to the second connection component being inserted a threshold distance into the first connection components, the locking pin aligns with the locking feature and moves radially toward the center line until the locking pin is in contact with at least one of upper, lower, and axial bearing surfaces of the locking feature.

8. The sensor interconnect system of claim 7, wherein responsive to a radial force away from the central axis being applied to the locking pin, the locking pin moves radially away from the central axis until the locking pin is removed from the locking feature and is no longer in contact the upper, lower, and axial bearing surfaces of the locking feature, the first connection component is removable via the application of a force to the first connection component away from the second connection component.

9. The sensor interconnect system of claim 8, wherein responsive to the application of the force away from the second connection component when the locking pin is removed from the locking feature, the locking pin moves along the alignment ramp radially toward the central axis as the second connection component is removed from the first connection component, and responsive to the second connection component being removed a threshold distance the first and second connection components are uncoupled.

10. The sensor interconnect system of claim 3, wherein responsive to the locking pin being misaligned with the alignment ramp the locking pin prevents insertion of the second connection component into the first connection component.

11. The sensor interconnect system of claim 1, wherein responsive to the first connection component being misaligned with the second connection component, the locating pin prevents the locking pin from aligning with the locking feature and coupling the first connection component to the second connection component.

12. The sensor interconnect system of claim 1, wherein the first connection component comprises a display that displays a metric corresponding to a condition in the contained fluid sensing area.

13. A method of assembly of a sensor interconnect system kit comprising:
providing a first connection component comprising a locking pin, a locating pin, and a spring loaded electrical contact comprising at least one contact pin;
providing a second connection component for insertion into the first connection component, the second connection component comprising an alignment feature, a locking feature, and a second electrical contact, the second connection component coupled to a sensor located in a contained fluid sensing area, wherein inserting the second connection component into the first connection component comprises:
aligning the alignment feature with the locking member wherein, the locking member, in conjunction with the alignment feature, maintains a lateral trajectory of the first connection component relative to the second connection component during insertion; and
inserting the second connection component into the first connection component until the locking pin interacts with the locking feature to maintain a lateral position of the first connection component relative to the second connection component, and until the locating pin interacts with the alignment feature to maintain a rotational position of the first connection component relative to the second connection component, and wherein, the at least one contact pin of the spring loaded electrical contact is in electrical communication with the second electrical contact.

14. The method of claim 13, wherein the providing a second connection component comprises providing a cylindrical body interrupted by the locking feature and the alignment feature and wherein the providing a first connection component comprises providing a hollow cylindrical body, wherein the first connection component houses the second connection component within the hollow cylindrical body when assembled.

15. The method of claim 13, wherein providing the alignment feature comprises providing an alignment ramp and first and second pin ledges, the alignment ramp comprising first and second alignment sidewalls that are separated an alignment distance from each other, the alignment distance is greater than or equal to a locking width of the locking pin, the alignment ramp located between the first pin ledge and the second pin ledge.

16. The method of claim 15, wherein providing the alignment feature comprises providing the first and second pin ledges aligned along a first longitudinal axis, and having lower ledge bearing surfaces and axial ledge bearing surfaces, wherein at least one of the first or second pin ledges contacts the locating pin.

17. A sensor interconnect system comprising:
a first connection component comprising a locking pin, a locating pin, and a spring loaded electrical contact comprising at least one contact pin; and
a second connection component comprising an alignment feature, a locking feature, and a second electrical contact, the second connection component coupled to a sensor located in a contained fluid sensing area, wherein the first connection component comprises a display that displays a metric corresponding to a condition that the sensor senses in the contained fluid sensing area, wherein, when assembled, the locking pin interacts with the locking feature to maintain a lateral position of the first connection component relative to the second connection component, wherein, the alignment feature comprises an alignment ramp, first and second pin ledges, and first and second alignment sidewalls that are separated an alignment distance from each other, the alignment distance is greater than or equal to a locking width of the locking pin, the alignment ramp located between the first pin ledge and the second pin ledge, the locating pin interacts with the alignment ramp to maintain a rotational position of the first connection component relative to the second connection component, and wherein, the at least one contact pin of the spring loaded electrical contact is in electrical communication with the second electrical contact to provide power to the sensor and to transmit the metric corresponding to the condition in the contained fluid sensing area to the display.

18. The sensor interconnect system of claim 17, wherein responsive to the locking pin being misaligned with the alignment ramp the locking pin prevents insertion of the second connection component into the first connection component.

19. The sensor interconnect system of claim 17, wherein, the first and second pin ledges are aligned along a first longitudinal axis, and have lower ledge bearing surfaces and axial ledge bearing surfaces, wherein at least one of the first or second pin ledges contacts the locating pin.

20. The sensor interconnect system of claim 16, the locking feature comprises a radial indentation having upper, lower, and axial bearing surfaces and wherein the locking pin interacts with at least one of the upper, lower, and axial bearing surfaces when assembled.

* * * * *